US011395242B2

(12) United States Patent
Anand et al.

(10) Patent No.: US 11,395,242 B2
(45) Date of Patent: Jul. 19, 2022

(54) LINK ESTABLISHMENT BETWEEN A RADIO EQUIPMENT CONTROLLER (REC) AND RADIO EQUIPMENT (RE) IN A FRONTHAUL NETWORK

(71) Applicant: Cisco Technology, Inc., San Jose, CA (US)

(72) Inventors: Prashant Anand, Bangalore (IN); Manoj Kumar, Bangalore (IN); Sudhir Kayamkulangara, Bangalore (IN); Dinuraj K, Bangalore (IN); Manigandan Boopalan, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 226 days.

(21) Appl. No.: 16/435,974

(22) Filed: Jun. 10, 2019

(65) Prior Publication Data
US 2020/0252893 A1 Aug. 6, 2020

(30) Foreign Application Priority Data

Feb. 1, 2019 (IN) .............................. 201941003988

(51) Int. Cl.
H04W 56/00 (2009.01)
H04W 76/10 (2018.01)
(Continued)

(52) U.S. Cl.
CPC ....... *H04W 56/0005* (2013.01); *H04W 28/22* (2013.01); *H04W 56/001* (2013.01); *H04W 76/10* (2018.02); *H04W 84/20* (2013.01)

(58) Field of Classification Search
None
See application file for complete search history.

(56) References Cited

U.S. PATENT DOCUMENTS 7,339,902 B2  3/2008  Tung et al.
9,313,827 B2  4/2016  Ilyadis
(Continued)

FOREIGN PATENT DOCUMENTS

EP    3468298 A1      4/2019
JP    201496633 A  *  3/2014  ............ H04W 56/00
(Continued)

OTHER PUBLICATIONS

Dong, machine translation of WO 2018/103083, Jun. 14, 2018 (Year: 2018).*

(Continued)

Primary Examiner — Noel R Beharry
Assistant Examiner — Rodrick Mak
(74) Attorney, Agent, or Firm — Edell, Shapiro & Finnan, LLC

(57) ABSTRACT

Techniques associated with link establishment in a fronthaul network are described herein. In one embodiment, a method includes receiving, by a proxy node, a Common Public Radio Interface (CPRI) bit stream transmitted by a radio equipment controller, wherein the CPRI bit stream is transmitted within a transmit time interval of the radio equipment controller; and fast-sampling, by the proxy node, the CPRI bit stream to determine whether a hyper frame number synchronization with the radio equipment controller at a common matching link bit rate is achievable, wherein the fast-sampling comprises attempting to decode the received CPRI bit stream and achieve the hyper frame number synchronization for each of a plurality of link bit rates configured for a fast-sampling time period during at least one fast-sampling time interval configured for the proxy node.

20 Claims, 12 Drawing Sheets

(51) Int. Cl.
*H04W 28/22* (2009.01)
*H04W 84/20* (2009.01)

(56) References Cited

U.S. PATENT DOCUMENTS

| | | | |
|---|---|---|---|
| 9,692,514 | B2 | 6/2017 | Laraqui |
| 2004/0208180 | A1 | 10/2004 | Light et al. |
| 2005/0232643 | A1 | 10/2005 | Aronson et al. |
| 2007/0025301 | A1 | 2/2007 | Petersson et al. |
| 2008/0232290 | A1 | 9/2008 | Elzur et al. |
| 2010/0291955 | A1 | 11/2010 | Sattele |
| 2011/0182255 | A1 | 7/2011 | Kim et al. |
| 2012/0052878 | A1 | 3/2012 | Sakama |
| 2012/0057572 | A1 | 3/2012 | Evans et al. |
| 2012/0113972 | A1 | 5/2012 | Liu et al. |
| 2012/0307713 | A1 | 12/2012 | Watanabe et al. |
| 2013/0100948 | A1 | 4/2013 | Irvine |
| 2014/0192796 | A1 | 7/2014 | Zhang |
| 2014/0198684 | A1 | 7/2014 | Gravely et al. |
| 2014/0241186 | A1* | 8/2014 | Garcia ............ H04W 24/02 370/252 |
| 2015/0131643 | A1 | 5/2015 | Oren |
| 2015/0146626 | A1 | 5/2015 | Sinha et al. |
| 2015/0207714 | A1 | 7/2015 | Ruffini et al. |
| 2015/0236785 | A1 | 8/2015 | Lamb et al. |
| 2015/0249549 | A1 | 9/2015 | Martinotti et al. |
| 2015/0304971 | A1 | 10/2015 | Shor et al. |
| 2016/0087446 | A1 | 3/2016 | Zainaldin et al. |
| 2016/0277964 | A1 | 9/2016 | Xu et al. |
| 2016/0302194 | A1* | 10/2016 | Sharma ............ H04W 56/0045 |
| 2017/0063491 | A1 | 3/2017 | Bruckman et al. |
| 2017/0127363 | A1 | 5/2017 | Tamamoto et al. |
| 2017/0324657 | A1 | 11/2017 | Zhong |
| 2018/0049147 | A1 | 2/2018 | Chen et al. |
| 2018/0070246 | A1 | 3/2018 | Jack et al. |
| 2018/0310199 | A1 | 10/2018 | Halabian et al. |
| 2018/0310331 | A1* | 10/2018 | Ostberg ............ H04W 28/00 |
| 2020/0221342 | A1 | 7/2020 | Zhang |

FOREIGN PATENT DOCUMENTS

| | | |
|---|---|---|
| JP | 2014096633 A | 5/2014 |
| WO | 2018001143 A1 | 1/2018 |
| WO | 2018/104175 A1 | 6/2018 |
| WO | 2018103083 A1 | 6/2018 |
| WO | 2018189726 A1 | 10/2018 |
| WO | 2019/045607 A1 | 3/2019 |

OTHER PUBLICATIONS

International Search Report and Written Opinion in counterpart International Application No. PCT/US2020/015157, dated May 20, 2020, 17 pages.
Kevin Bross, "Control Packets for RoE; tf3_1604_bross_control_packets_1", vol. 802.3, retrieved on Apr. 19, 2016, 28 pages.
Antonio de la Oliva et al., "An overview of the CPRI specification and its application to C-RAN based LTE scenarios", https://ieeexplore.ieee.org/document/7402275, Feb. 11, 2016, 7 pages.
Texas Instruments Wiki, "CPRI Protocol", http://processors.wiki.ti.com/index.php/CPRI_Protocol, Aug. 25, 2009, 6 pages.
Ericsson AB, Huawei Technologies Co. Ltd, NEC Corporation, Alcatel Lucent, and Nokia Networks,"Common Public Radio Interface (CPRI); Interface Specification", CPRI Specification V7.0, Oct. 9, 2015, 128 pages.
Richard Maiden, "IEEE1914.3™ Standard for Radio over Ethernet Encapsulations and Mappings", Oct. 25, 2017, 27 pages.
IEEE, "P1914.1/D5.0, Apr. 2019—IEEE Draft Standard for Packet-based Fronthaul Transport Networks", https://ieeexplore.ieee.org/document/8703261, Apr. 25, 2019, 2 pages.
The Institute of Electrical and Electronics Engineers, Inc., "P1914.3™/D3.2 Draft Standard for Radio over Ethernet Encapsulations and Mappings", Jun. 2018, 76 pages.
The Institute of Electrical and Electronics Engineers, Inc., "P1914.3™/D3 Draft Standard for Radio over Ethernet Encapsulations and Mappings", Jan. 2018, 74 pages.
Paul Hardy, "XCPRI: A Single-Chip CPRI PHY Layer Implemented in the Virtex-II Pro FPGA", Application Note: Virtex-II Pro FPGA Family, May 9, 2017, 27 pages.
Peter K. Cho et al., "PoC of Structure agnostic Radio over Ethernet", Apr. 2017, 23 pages.
Non-Final Office Action in U.S. Appl. No. 16/573,162, dated Nov. 14, 2019, 16 pages.
International Search Report and Written Opinion in counterpart International Application No. PCT/US2020/015158, dated May 18, 2020, 15 pages.
3GPP, "3rd Generation Partnership Project; Technical Specification Group Radio Access Network; Evolved Universal Terrestrial Radio Access (E-UTRA); Base Station (BS) radio transmission and reception (Release 16)", 3GPP TS 36.104 V16.2.0, Jun. 2019, 265 pages.
IEEE Communications Society,"P1914.1 ™/D3.0 Draft Standard for Packet-based Fronthaul Transport Networks", Nov. 2018, 95 pages.
IEEE Communications Society, "IEEE Standard for Radio over Ethernet Encapsulations and Mappings", IEEE Std 1914.3™, Nov. 28, 2018, 77 pages.
Ericsson AB, Huawei Technologies Co. Ltd, NEC Corporation, Alcatel Lucent, and Nokia Networks, "Common Public Radio Interface: eCPRI Interface Specification", eCPRI Specification V2.0, Oct. 5, 2019, 109 pages.
Ericsson AB, Huawei Technologies Co. Ltd, NEC Corporation, Alcatel Lucent, and Nokia Networks, "Common Public Radio Interface: eCPRI Interface Specification", eCPRI Specification V1.2, Jun. 25, 2018, 62 pages.
International Search Report and Written Opinion in counterpart International Application No. PCT/US2020/015156, dated May 4, 2020, 17 pages.
Ericsson AB et al., "Common Public Radio Interface (CPRI); Interface Specification", CPRI Specification V7.0, Oct. 9, 2015, 128 pages.
Ericsson AB, Huawei Technologies Co. Ltd, NEC Corporation and Nokia, "Common Public Radio Interface: eCPRI Interface Specification", eCPRI Specification V2.0 (May 10, 2019), 109 pages.
IEEE, "IEEE Standard for Radio over Ethernet Encapsulations and Mappings", IEEE Std 1914.3™, Oct. 5, 2018, 77 pages.
Office Action in U.S. Appl. No. 16/435,946, dated Aug. 4, 2020, 25 pages.
Office Action in U.S. Appl. No. 16/435,961, dated Mar. 8, 2021, 55 pages.

* cited by examiner

LINK ESTABLISHMENT BETWEEN A RADIO EQUIPMENT CONTROLLER (REC) AND RADIO EQUIPMENT (RE) IN A FRONTHAUL NETWORK

PRIORITY CLAIM

This application claims priority to Indian Provisional Application No. 201941003988, entitled "FRONTHAUL NETWORK SOLUTIONS," filed on Feb. 1, 2019, the disclosure of which application is hereby incorporated by reference in its entirety.

TECHNICAL FIELD

The present disclosure relates to communication systems, in particular, to techniques to provide link establishment between a radio equipment controller (REC) and radio equipment (RE) in a fronthaul network.

BACKGROUND

Mobile networking architectures have grown increasingly complex in communication environments. In particular, access network configurations for mobile networking architectures have become more complex. As access network configurations become more complex, facilitating communications among access network elements such as a radio equipment controller and radio equipment becomes more critical. Accordingly, there are significant challenges in facilitating communications between a radio equipment controller and radio equipment in a network.

DESCRIPTION OF EXAMPLE EMBODIMENTS

Overview

Figure 1:
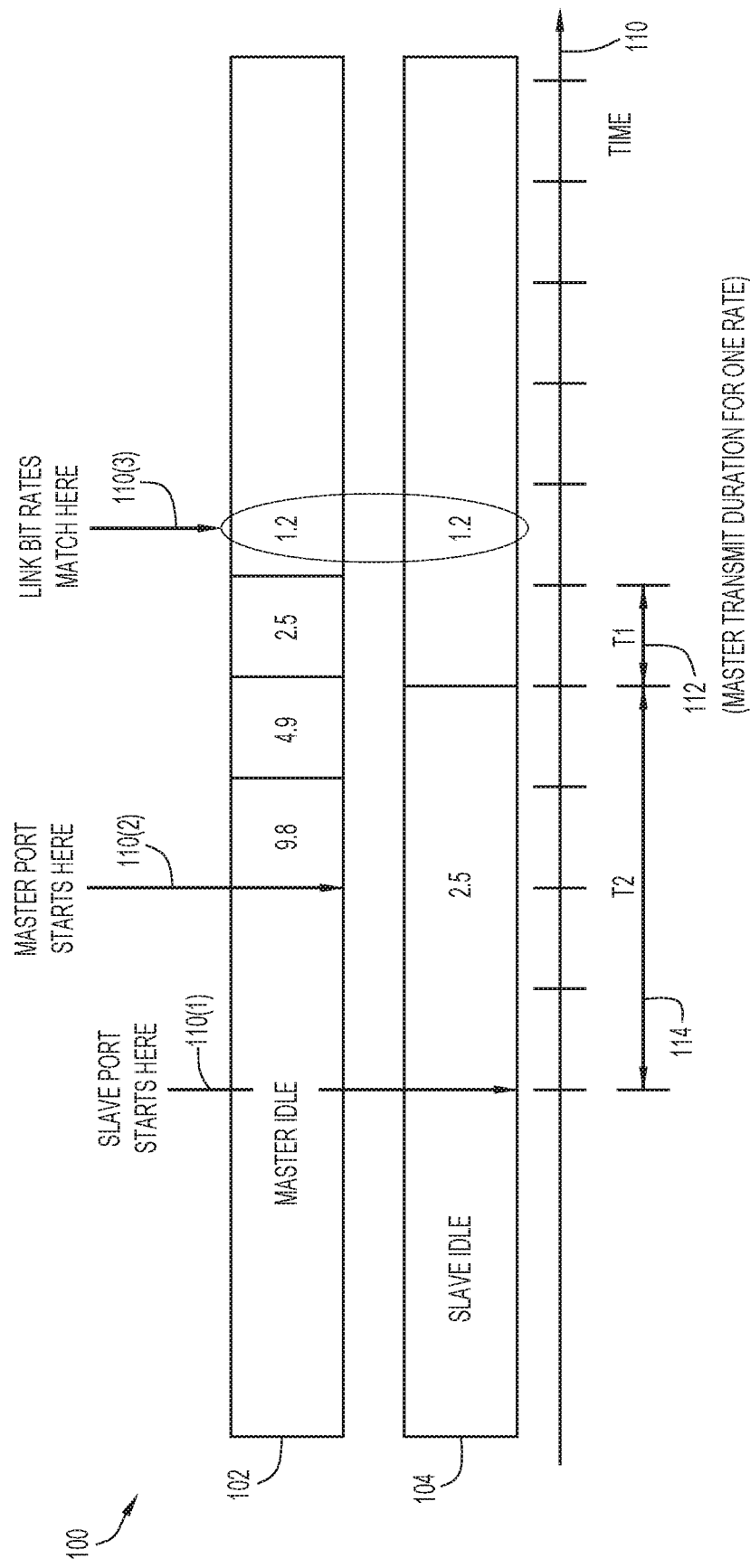
FIG. 1 is a simplified diagram again illustrating example details associated with Common Public Radio Interface (CPRI) link bit rate negotiation.

Provided herein are techniques associated with link establishment between a radio equipment controller (REC) and a radio equipment (RE) in a fronthaul network. Using techniques discussed for embodiments described herein, a network operator can deploy Common Public Radio Interface (CPRI)-based REC and RE of varied capabilities in a fronthaul network and the techniques discussed for embodiments herein can be used to achieve deterministic end-to-end CPRI link synchronization between the REC and RE.

In one embodiment, a computer-implemented method is provided and may include receiving, by a proxy node, a Common Public Radio Interface (CPRI) bit stream transmitted by a radio equipment controller, wherein the CPRI bit stream is transmitted within a transmit time interval of the radio equipment controller; and fast-sampling, by the proxy node, the CPRI bit stream to determine whether a hyper frame number synchronization with the radio equipment controller at a common matching link bit rate is achievable, wherein the fast-sampling comprises attempting to decode the received CPRI bit stream and achieve the hyper frame number synchronization for each of a plurality of link bit rates configured for a fast-sampling time period during at least one fast-sampling time interval configured for the proxy node.

In another embodiment, another computer implemented method is provided and may include performing, for one or more link bit rates of a plurality of link bit rates configured for a fronthaul network, Common Public Radio Interface (CPRI) Layer 1 link auto-negotiation operations to establish a CPRI link between a radio equipment controller and a radio equipment of the fronthaul network, the CPRI Layer 1 link auto-negotiation operations comprising: fast-sampling, by a proxy slave, a CPRI bit stream transmitted by a radio equipment controller to achieve a hyper frame number synchronization with the radio equipment controller at a matching link bit rate, wherein the fast-sampling comprises attempting to achieve the hyper frame number synchronization for each of a plurality of link bit rates configured for a fast-sampling time period during at least one fast-sampling time interval configured for the proxy slave. Upon the proxy slave achieving the hyper frame number synchronization with the radio equipment controller, the proxy slave starts transmitting the CPRI bit stream after mapping into RoE frames as per the matching link bit rate along with the matching link bit rate information in the RoE frame header from the proxy slave to a proxy master.

The proxy master begins transmitting the CPRI bit stream to the radio equipment immediately and the radio equipment attempts to achieve a hyper frame number synchronization. On achieving a hyper frame number synchronization with this proxy master transmitted stream which was originated at radio equipment controller, the radio equipment also starts playing out CPRI bit stream towards the proxy master at the same link bit rate; the proxy master transmits this received CPRI bit stream towards the proxy slave after mapping to RoE frames which is then played out as CPRI bit stream towards the radio equipment controller by the proxy slave. All this occurring within a fixed transmit time interval for a link bit rate on the radio equipment controller ensures the Layer 1 link auto-negotiation operations are completed and the CPRI link is established between the radio equipment controller and the radio equipment when the radio equipment controller achieves a hyper frame number synchronization for the CPRI bit stream transmitted by the proxy slave.

Example Embodiments

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. Internet Protocol (IP) addresses discussed herein and in the claims can include IP version 4 (IPv4) and/or IP version 6 (IPv6) addresses. For example, various Layer 1 (L1) and/or Layer 2 (L2) communications/operations may be referenced herein.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element or node.

In general, 3rd Generation Partnership Project (3GPP) mobile network architectures such as 3GPP Long Term Evolution (LTE) architectures, sometimes referred to as 4th Generation (4G)/LTE architectures, as well as 3GPP 5th Generation (5G) architectures can be implemented via a core network and one or more 3GPP access networks in which user equipment (UEs) connect to a core network via over-the-air Radio Frequency (RF) communications with radio units or radio equipment (RE) of the access networks. Some 3GPP access networks can be implemented in a configuration that includes a radio equipment controller (REC) that interfaces with the core network and also that interfaces with one or more RE. In some instances, an REC may also be referred to as a Baseband Unit (BBU) and an RE may be referred to as a Remote Radio Head (RRH). Both the REC and RE are two basic building blocks of a radio base station. The REC is concerned with the Network Interface transport, the radio base station control and management as well as the digital baseband processing. The RE provides the analogue and radio frequency functions via a radio head such as filtering, modulation, frequency conversion and amplification or, more generally, RE serves as the air interface, to the user equipment.

In current deployments of co-located REC and RE, the Common Public Radio Interface (CPRI) is used as directly connected bi-directional point-to-point over fiber. In general, CPRI is a point to point bit synchronous serial data link between the co-located REC and the RE providing an 'always ON constant bit rate' steady data stream. As referred to herein, the terms 'data link' and 'link' can be used interchangeably.

Referring to FIG. 1, FIG. 1 is a simplified diagram 100 illustrating example details associated with CPRI link bit rate negotiation. FIG. 1 illustrates the transmit link bit rates 102 for a CPRI bit stream transmitted by the master port (REC) and receive/decode link bit rates 104 at which a slave port (RE) attempts to receive and decode the master port (REC) transmitted CPRI bit stream in relation to times 110(1)-110(3), as represented along a time axis 110.

A CPRI link negotiation is performed to negotiate a common matching link bit rate for establishing the bi-directional CPRI data link between co-located REC and RE. CPRI Specification version 7.0 (v7.0), published Oct. 9, 2015, describes the current procedure for link negotiation between REC and RE in direct connected deployments, in which the master port (REC) drives the link bring-up with the slave port (RE) and link bit rate auto negotiation, L1 synchronization, and frame synchronization/alignment all happen together directly between the co-located REC and RE. For CPRI Specification v7.0, bit rate is referred to as 'line bit rate'; however, for purposes of discussions herein, the term 'link bit rate' will be used. Further as referred to herein, the terms 'link auto-negotiation', 'link negotiation', and 'link bit-rate negotiation', may be used interchangeably. Further as referred to herein, the terms 'synchronization' and 'sync' may be used interchangeably.

CPRI L1 synchronization accomplishes two things between the master and slave ports: byte alignment and hyper frame alignment for CPRI bit streams transmitted via the data link between the co-located REC and RE at a common matching link bit rate for the master and slave. Following frame synchronization/alignment, negotiations associated with protocol setup and control and management (C&M) setup, also referred to as L2 negotiations, are performed to determine a highest common matching link bit rate for the master and slave (if not already selected during the L1 sync) and also to determine a CPRI (in-band) C&M channel bit rate, C&M protocol, and vendor specific negotiations/signaling.

Current CPRI Link Auto-Negotiation:

The following procedure is used to arrive at a common matching link bit rate as per CPRI Specification v7.0:

Master Port Actions:

1. The master port starts to transmit a CPRI bit stream at the highest available link bit rate directly and also starts to attempt receiving a CPRI bit stream (e.g., from the slave port) at the same link bit rate. If the frame alignment is not reached with the slave port, it selects the next highest link bit rate from its rate table (e.g., capability set) for transmission after a T1 time interval (0.9-1.1 seconds), if available.

2. Each following T1 time interval, a new link bit rate is chosen for transmission and reception (if available).

3. The link bit rates are selected from the available set in a round robin fashion, i.e. the first highest, the second highest, and so on to the slowest, and then restarting from the highest link bit rate.

Slave Port Actions:

1. The slave port starts attempting to receive a CPRI bit stream (e.g., from the master port) at the highest available link bit rate directly. If the frame alignment is not reached with master port, it selects another link bit rate for CPRI bit stream reception after a T2 time interval (3.9-4.1 seconds), if available.

2. Each following T2 time interval, a new reception link bit rate is chosen for reception (if available).

3. The link bit rates are selected from an available set (sometimes referred to as a 'capability set') in a round robin fashion, i.e., the first highest, the second highest, and so on to the slowest, and then restarting from the highest link bit rate.

4. When the slave port reaches a hyper frame number (HFN) sync it starts transmitting a CPRI bit stream toward the master port on the same link bit rate. As prescribed by CPRI Specification v7.0, HFN sync is achieved by a CPRI port upon four consecutive successful detections of a SYNC byte in a CPRI bit stream received by the CPRI port. When the master port is able to receive and decode the slave port transmitted CPRI bit stream (e.g., achieve HFN sync), since the master port is also tuned at the same link bit rate, the link negotiation is considered complete and L1 synchronization is achieved as both nodes are able to communicate with each other now.

The above 7 steps are repeated until a common link bit rate match is achieved between the co-located REC and RE. Per CPRI Specification v7.0 Section 4.5.2, the above steps/actions are associated with a start-up process that is implemented via a CPRI port state machine configured for the CPRI interface elements/ports of the REC and RE in which operations, events, and transitions through states of the CPRI port state machine are prescribed according to CPRI Specification v7.0.

Consider an example as illustrated in FIG. 1. If the master port (REC) has a capability set in which it is capable of {9.8, 4.9, 2.5, and 1.2} Gigabits per second (Gbps) CPRI link bit rates and the slave port (RE) is capable of {2.5 and 1.2} Gbps CPRI link bit rates, the following occurs:

Master port starts transmitting a CPRI bit stream at a time 110(2) and changes it's transmit link bit rate 102 after every T1 (09-1.1. seconds) time interval 112.

Slave port starts attempting to receive/decode at a time 110(1) (earlier than the time 110(2) at which the master port starts transmitting) and changes its receive/decode link bit rate 104 after every T2 (3.9-4.1 seconds) time interval 114.

Both continue until a matching link bit rate is found and HFN sync is achieved, as shown at a time 110(3).

While the link negotiation procedure can be performed according CPRI Specification v7.0 when the REC and RE are co-located and directly connected, the procedure cannot work in fronthaul networks in which the REC and RE are interconnected through one or more intermediate nodes via a packet-based network, such as an Ethernet network.

The presence of the intermediate nodes in a fronthaul network poses a discontinuity problem for establishing the CPRI link negotiation (e.g., comprising link bit rate negotiation, L1 synchronization, and frame synchronization/alignment) between the REC and RE using the process prescribed by CPRI Specification v7.0. In fronthaul networks, the REC and RE endpoints cannot communicate directly with each other due to presence of CPRI interfacing Ethernet nodes as all these nodes may be running at different rates. Without having a commonly understandable CPRI link bit rate across the entire CPRI path for the CPRI interfacing nodes, the end-to-end CPRI link negotiation cannot be achieved.

Fronthaul Nomenclature

In a fronthaul network, the REC and RE do not interact directly; rather Ethernet nodes capable of CPRI mapping and de-mapping (e.g., mapping and de-mapping between a CPRI bit stream and Ethernet frames and vice-versa, depending on the direction of communications) interface with the REC and RE. The Ethernet node capable of CPRI mapping/de-mapping connected directly to the REC is referred to herein as a 'Proxy Slave' or a 'CPRI Proxy Slave' and the Ethernet node capable of CPRI mapping/de-mapping connected directly to the RE is referred to herein as a 'Proxy Master' or a 'CPRI Proxy Master'. The Proxy Master and the Proxy Slave nodes may be referred to generally as 'proxy nodes'.

In a typical fronthaul network, the Proxy Master and Proxy Slave can communicate over a packet-based network, such as an Ethernet network, using Radio over Ethernet (RoE) communications, as prescribed by the Institute of Electrical and Electronics Engineers (IEEE) 1914.1 and IEEE 1914.3 Specifications, approved Sep. 27, 2018. IEEE 1914.1 and 1914.3 (referred to herein as 'IEEE 1914 standards') provide standards for encapsulation and mapping/de-mapping of radio data, such as CPRI bit streams, and/or potentially control and/or management packets within Ethernet frames. For a given Ethernet frame, radio data and/or potentially control and/or management packets can be included within a RoE frame that is encapsulated in the Ethernet frame. As discussed in further detail herein, a RoE frame can include an RoE header and an RoE payload.

The IEEE 1914 standards define different RoE mappers/de-mappers, including: structure-aware, structure-agnostic, and native mode in which structure-aware mapping/de-mapping operations can be used for CPRI data, structure-agnostic mapping/de-mapping operations can be used for any digitized radio data, and native mode mapping/de-mapping operations can be used for digitized radio In-phase/Quadrature (I/Q) payload data.

The structure-agnostic RoE mapper is considered for embodiments described herein. While the IEEE 1914.1 and IEEE 1914.3 Specifications provide standards for encapsulation and mapping/de-mapping of CPRI bit streams over packet-based fronthaul transport networks, the standards do not cover how end-to-end link negotiations can be performed between an REC and RE in fronthaul networks.

Further, current CPRI link negotiation processes as prescribed by CPRI Specification v7.0 will not work in fronthaul networks. Recall, the key points for end-to-end CPRI link negotiation as prescribed by CPRI Specification v7.0 are:

1. That the HFN sync shall be achieved directly between REC and RE.
2. That the current non-fronthaul CPRI negotiation is a probabilistic method as the slave and master attempt different link rates at the same time. Rates are changed at both ends after different intervals; the master changes the link rate for transmission every 0.9-1.1 seconds and the slave changes the link rate for reception every 3.9-4.1 seconds. Using the method as prescribed by CPRI Specification v7.0 for a non-fronthaul network, both tend to reach at a common match. If the match does not happen in one iteration of 3.9-4.1 seconds, the procedure is repeated again.

However, in a fronthaul network, when using current CPRI link negotiation processes as prescribed by CPRI Specification v7.0, the following can occur:

1. The REC will start at one rate and the Proxy Slave will engage in local CPRI negotiations with the REC. A common match will be found during this negotiation. However, the Proxy Slave still needs to involve the RE in this process.
2. At this stage, the Proxy Slave will start communications towards the Proxy Master (and the RE) using the same rate. The problem here is that the Proxy Master is also not tuned for this rate at this point.
3. Say, for example, that the Proxy Master also tunes to this same rate using some control channel communication with the Proxy Slave, the Proxy Master then needs to involve RE in this procedure. The time taken in this communication is a key variable affecting the whole end-to-end negotiation.
4. At this stage, the Proxy Master will first need to ensure that this above rate is supported at the RE using the same CPRI link negotiation procedure.
5. Carrying out the steps 2-4 will take time and due to the delay, what will happen is that that the REC (the original Master) will have moved to a different bit rate already by the time the Proxy Slave and the RE reaches a common rate. Thus, this whole procedure will be repeated again and again. It should be noted that there is only the prescribed window of 0.9-1.1 seconds in which steps 2-4 need to be carried out in order for the HFN sync to be achieved between REC and RE, otherwise the overall negotiation may not be achieved at all.

One possible solution arriving at a common link rate on all nodes including the REC and RE in the CPRI path flow may be to use a manual static configuration at all CPRI endpoints and the intermediate CPRI interfacing nodes; however, such a solution is error prone, inefficient at times, and not scalable.

Example embodiments described herein provide techniques to overcome these hurdles by providing a mechanism to provide CPRI link establishment between an REC and an RE in an Ethernet-based fronthaul network. A CPRI link for a fronthaul network is a cross product of CPRI and Ethernet as the end-to-end nodes (REC/RE) use CPRI only to communicate with each other via the proxy nodes, which perform mapping/de-mapping and link monitoring operations. Thus, embodiments described herein may facilitate end-to-end CPRI link synchronization between an REC and an RE in which the REC represents one end and the RE represents another end of the end-to-end CPRI link synchronization.

Figure 2:
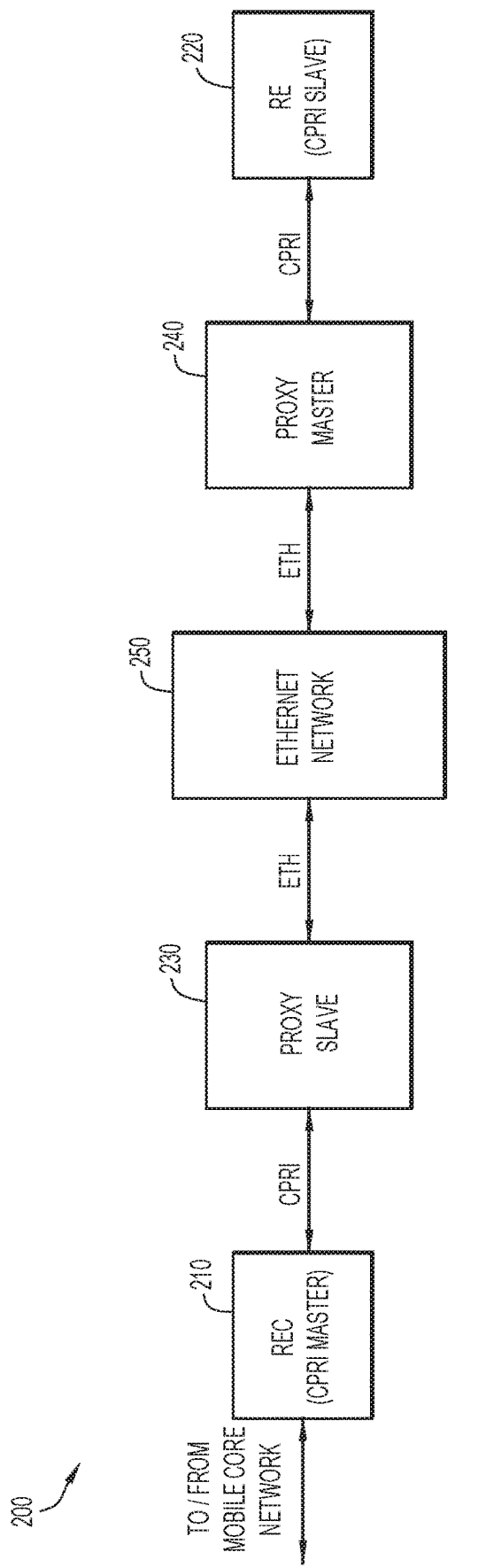
FIG. 2 is a simplified diagram illustrating example details associated with a fronthaul network in which techniques to provide link establishment between a radio equipment controller and a radio equipment may be implemented, according to an example embodiment.

Referring to FIG. 2, FIG. 2 is a simplified diagram illustrating example details associated with a fronthaul network 200 in which techniques to provide link establishment between an REC 210 and RE 220 may be implemented, according to an example embodiment. FIG. 2 includes REC 210, RE 220, a Proxy Slave 230, a Proxy Master 240, and an Ethernet network 250. As referred to herein, REC 210 may also be referred to as the 'CPRI Master' and RE 220 may be referred to as the 'CPRI Slave'. Further as referred to herein, fronthaul network 200 may also be referred to as an Ethernet-based fronthaul network 200.

In at least one embodiment, at least one CPRI interface element/port may be configured for each of Proxy Slave 230 and Proxy Master 240 in which the CPRI port state machine may be configured for the CPRI interface element/port for each of Proxy Slave 230 and Proxy Master 240. As discussed for embodiments herein, some operations of Proxy Slave 230 involving L1 link negotiations/sync with REC 210 may differ from the standard negotiation/sync processes as described by CPRI Specification v7.0, while other operations, such as updating internal states of the CPRI port state machine for REC 210 may follow the processes described by CPRI Specification v7.0. In at least one embodiment, at least one Ethernet interface element/port may also be configured for each of Proxy Slave 230 and Proxy Master 24 to facilitate communications via Ethernet network 250.

As illustrated in FIG. 2, the interconnection between REC 210 and Proxy Slave 230 is a CPRI interconnection, the interconnection between Proxy Slave 230 and Ethernet network 250 is an Ethernet interconnection, the interconnection between RE 220 and Proxy Master 240 is a CPRI interconnection, and the interconnection between Proxy Master 240 and Ethernet network 250 is an Ethernet interconnection. REC 210 may further interface with a 3GPP mobile core network (not shown).

Proxy Slave 230 is an Ethernet node connected directly to REC 210 and also to Ethernet network 250. Proxy Slave 230 is capable of performing CPRI mapping and de-mapping for various communications/operations within fronthaul network 200, as discussed herein. Proxy Master 240 is an Ethernet node connected directly to RE 220 and also to Ethernet network 250. Proxy Master 240 is capable of performing CPRI mapping and de-mapping for various communications/operations, as discussed herein. Proxy Slave 230 and Proxy Master 240 may interface with each other using Ethernet-based communications using Ethernet network 250.

RoE frames encapsulated within Ethernet frames may be utilized for communications of radio data to/from REC 210 and RE 220 in which Proxy Slave 230 and Proxy Master 240 can map/de-map CPRI bit streams to/from RoE frames for communications across Ethernet network 250 and with each of REC 210 and RE 220 (e.g., via the CPRI interconnection between Proxy Slave 230 and REC 210 and also via the CPRI interconnection between Proxy Master 240 and RE 220) to facilitate end-to-end communications between REC 210 and RE 220.

As noted above, the structure-agnostic RoE mapper is considered for embodiments described herein.

In at least one embodiment, as discussed in further detail herein, a RoE header of an RoE frame may be enhanced to include link bit rate information to facilitate end-to-end L1 link auto-negotiation operations and CPRI link establishment between REC 210 and RE 220 for fronthaul network 200.

Figure 3:
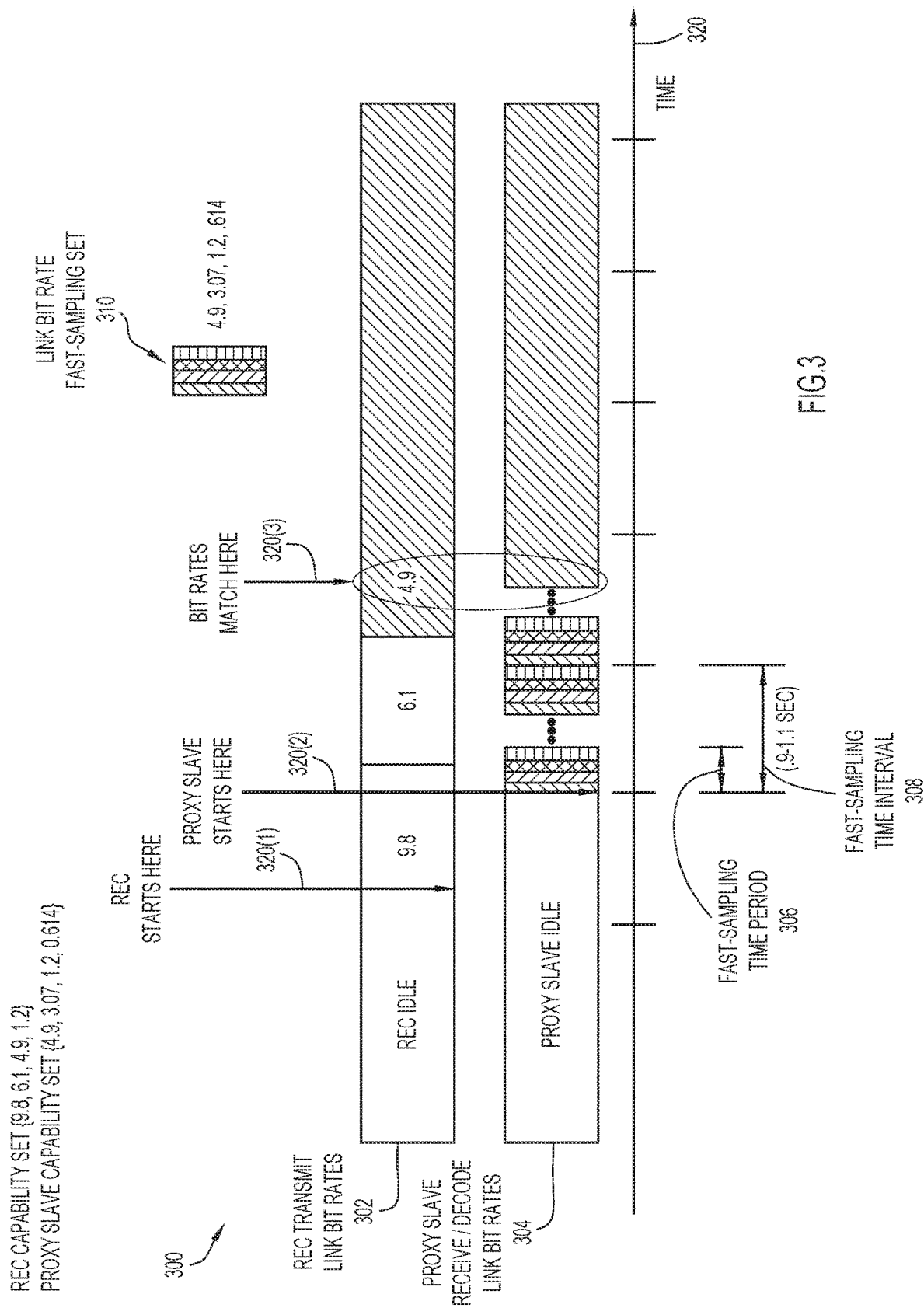
FIG. 3 is a simplified diagram illustrating example details associated with fast sampling a CPRI bit stream by a proxy node during link establishment operations, according to an example embodiment.

Referring to FIG. 3, FIG. 3 is a simplified diagram 300 illustrating example details associated with fast-sampling a CPRI bit stream by a proxy node during link establishment operations, according to an example embodiment. Reference is also made to FIG. 2 in connection with the description of FIG. 3.

For the embodiment of FIG. 3, consider that REC 210 is configured with a capability set including link bit rates of {9.8, 6.1, 4.9, 1.2} Gbps and Proxy Slave 230 is configured with a capability set including link bit rates of {4.9, 3.07, 1.2, 0.614} Gbps. Example details illustrated in FIG. 3 are illustrated reference to time, represented by a time axis 320. As illustrated in FIG. 3, REC 210 transmits a CPRI bit stream at link bit rates 302 according to its capability set starting at 320.

As per CPRI Specification v7.0, in a non-fronthaul deployment REC begins to transmit a CPRI bit stream at a given link bit rate for 0.9-1.1 seconds while the RE (slave) tries to receive and decode for 3.9-4.1 seconds and the procedure is repeated.

Embodiments herein, however, provide techniques for an enhanced procedure in which Proxy Slave 230 can achieve HFN sync within a shorter period of time than the procedure as prescribed per CPRI Specification v7.0. For example, embodiments herein provide that Proxy Slave 230 may perform oversampling or fast-sampling of a REC 210 transmitted CPRI bit stream multiple times using its own supported link rates starting with the highest rate, next highest rate, and so on, and then repeating the same starting with the highest rate until a common matching link bit rate is achieved for the REC 210 transmitted stream. Assuming a that a matching link bit rate is configured for Proxy Slave 230 and for REC 210, this will result in achieving a link bit rate match between the REC and the Proxy Slave within a first complete fast-sampling time interval (0.9-1.1 seconds) of the Proxy Slave.

As illustrated in FIG. 3, Proxy Slave 230 attempts to receive and decode for one or more fast-sampling time periods 306 of a fast-sampling time interval 308 in which the fast-sampling time interval is set to 0.9-1.1 seconds in duration, which is based on the transmit time interval (0.9-1.1 seconds) for REC 210. For a particular fast-sampling time period 306, Proxy Slave 230 switches between link bit rates of a link bit rate fast-sampling set 310, which is configured with link bit rate values in an order that is based on the capability set configured for Proxy Slave 230. For example, as illustrated in FIG. 3, the link bit rate fast-sampling set 310 includes link bit rates 4.9 Gbps, 3.07 Gbps, 1.2 Gbps, and 0.614 Gbps in which the values and the order of the values are set to the same values and order of values of the capability set configured for Proxy Slave 230 for the embodiment of FIG. 3.

In one iteration of the fast-sampling time period 306, Proxy Slave 230 will use all of the configured rates of link bit rate fast-sampling set 310, one by one, to attempt to receive and decode a CPRI bit stream transmitted by REC 210 (assuming the REC has begun transmissions). The number of iterations of fast-sampling periods time 306 that may be utilized within the fast-sampling time interval 308 may vary depending on the configuration and hardware-based capabilities (e.g., Field Programmable Gate Array (FPGA) capabilities, etc.) to switch among different link bit rates and achieve clocking locks for each rate in order to attempt decoding at each rate. In at least one embodiment, the number of iterations of fast-sampling time periods 306 may be set to at least one iteration such that all link bit rates of a configured a link bit rate fast-sampling set 310 are utilized for at least one full fast-sampling time period 306 within a fast-sampling time interval 308. Although a complete single iteration of fast-sampling time period 306 is sufficient for determining a common matching link bit rate, it may be preferable in some embodiments, depending on configuration and hardware-based capabilities, to set the number of intervals to some other small number (e.g., 2, 3, etc.) such that multiple iterations may be utilized within a fast-sampling time interval 308.

In at least one embodiment, the following fast-sampling procedure may be used by Proxy Slave 230 to achieve a HFN sync for a CPRI bit stream transmitted by REC 210.

1. For fronthaul network 200, embodiments herein provide that Proxy Slave 230 will try to receive the CPRI stream using all its configured rates for link bit rate fast-sampling set 310 at least one (and preferably multiple) times within the fast sampling time interval 306 of 0.9-1.1 seconds so that if there is a matching link bit rate available with Proxy Slave 230, the matching link bit rate is found with this one fast-sampling time interval 306 of 0.9 seconds.

1.1. If multiple fast-sampling period 308 iterations are possible as per hardware design in which the number of iterations is 'N', Proxy Slave 230 will attempt to receive the REC 210 transmitted CPRI stream using all of the configured rates at least N times, where N can be 1, 2, 3, etc.

1.2. For example, consider that the number of iterations of fast sampling period 308 is set to 3 for Proxy Slave 230. In this example, Proxy Slave 230 will attempt successful receipt and decode of the CPRI stream using the highest link bit rate and wait for HFN sync before changing the rate to the next highest rate if the HFN sync did not happen in a finite time (e.g., a small value to allow at least 3 iterations of the going over the entire capability set and finding a match with REC's rate). For this example of for 4 link bit rates configured on Proxy Slave 230, consider that Proxy Slave 230 will attempt at least 12 rate changes during the 0.9 second window.

2. For this example, in case the REC 210 transmission was already started before proxy slave started the sampling, it can take Proxy Slave 230 a maximum of 5 fast-sampling intervals 308 of 0.9-1.1 seconds, in the worst case, to establish a common matching link bit rate with REC 210 (if a match is possible).

Consider example details illustrated in FIG. 3 in which REC 210 starts transmitting a CPRI bit stream at a time 320(1). At a time 320(2), Proxy Slave 230 starts attempting to receive and decode the CPRI bit stream for an N number of fast-sampling time periods 306 within fast-sampling time intervals 308 such that a common matching link bit rate with REC 210 is achieved at 320(3).

Thus, for fronthaul network 200, embodiments herein provide that Proxy Slave 230 will try to receive the CPRI stream using all its configured rates one or multiple times within the fast-sampling time interval 308 of 0.9-1.1 seconds so that if there is a common matching link bit rate transmitted by REC 210 and available with Proxy Slave 230, the common matching link bit rate is found with a fast-sampling time interval 308 of 0.9-1.1 seconds. Using fast-sampling by Proxy Slave 230, embodiments herein provide for the ability to achieve deterministic end-to-end CPRI link synchronization between the REC 210 and RE 220, as discussed in further detail herein.

Figure 4:
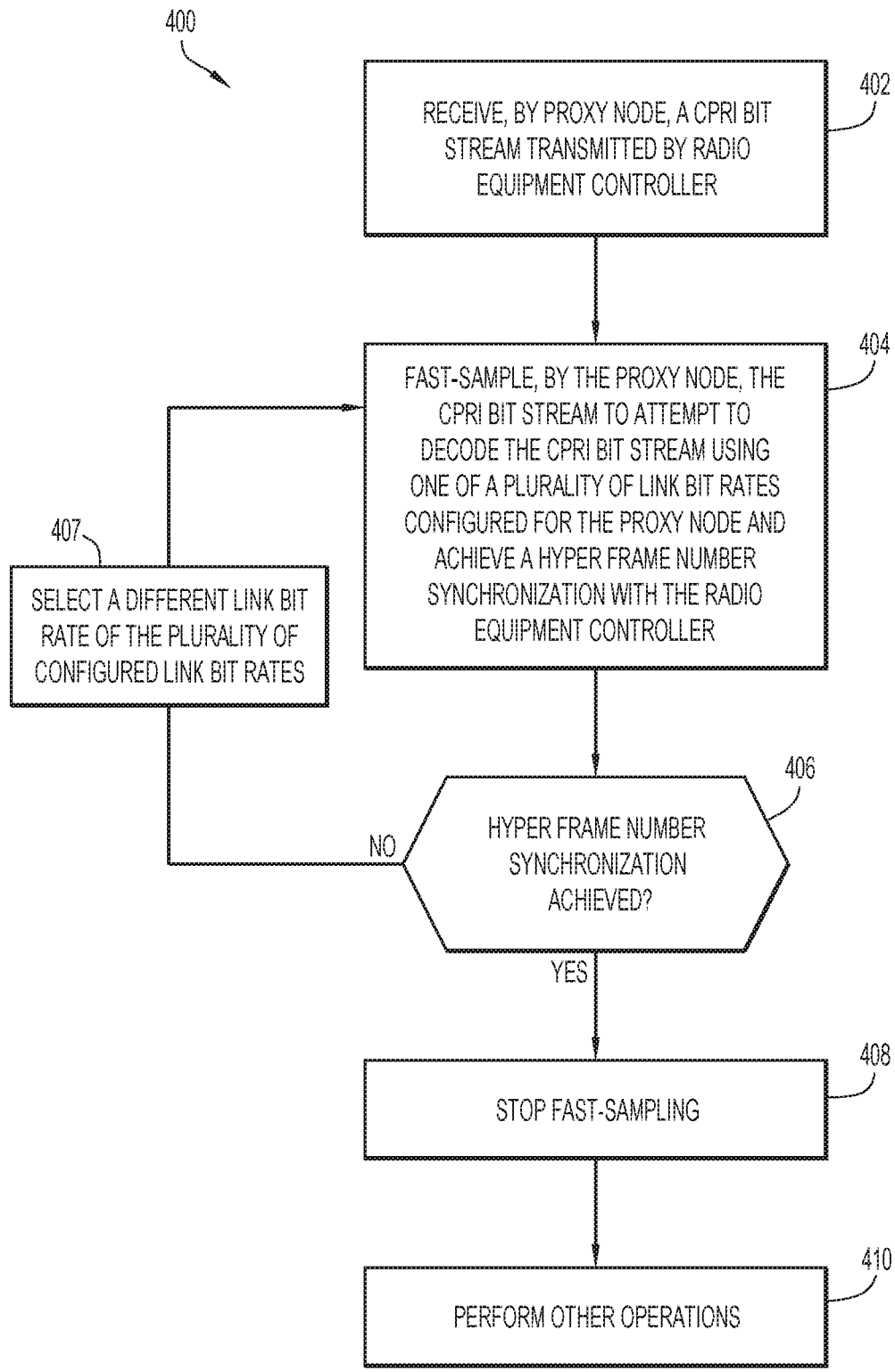
FIG. 4 is a simplified flowchart illustrating example operations to perform CPRI bit stream fast-sampling by a proxy node, according to an example embodiment.

FIG. 4 is a simplified flowchart illustrating example operations 400 to perform CPRI bit stream fast-sampling by a proxy node, according to an example embodiment. In at least one embodiment, operations 400 may be performed by a proxy node, such as Proxy Slave 230 for fronthaul network 200 of FIG. 2. Reference is also made to FIGS. 2 and 3 in connection with the description of FIG. 4.

In at least one embodiment, operations 400 may begin at 402 and may include receiving, by the proxy node (e.g., Proxy Slave 230), a CPRI bit stream transmitted by a radio equipment controller (e.g., REC 210) in which the CPRI bit stream is transmitted within a transmit time interval of the radio equipment controller.

At 404, the operations may include fast-sampling, by the proxy node, the CPRI bit stream to attempt to decode the CPRI bit stream using one of a plurality of link bit rates configured for the proxy node and achieve a hyper frame number synchronization with the radio equipment controller. At 406, the operations include determining whether the hyper frame number synchronization is achieved for a common matching link bit rate. The hyper frame number synchronization can be achieved on successful decode of the received CPRI bit stream at a common matching link bit rate.

Based on a determination at 406 that the hyper frame number synchronization is not achieved, the operations include selecting, at 407, a different link bit rate of the plurality of configured link bit rates (e.g., the next highest link bit rate are re-starting from the lowest link bit rate) and continuing the fast-sampling at 404. For example, the proxy node may attempt to decode the CPRI bit stream and achieve the hyper frame number synchronization for each of a plurality of link bit rates configured for a fast-sampling time period by performing fast-sampling during at least one fast-sampling time interval configured for the proxy node (e.g., link bit rates configured for link bit rate fast-sampling set 310 based on the Proxy Slave 230 capability set, which are used to attempt HFN sync with REC during fast-sampling time period 306 of fast-sampling time interval 308).

Based on a determination at 406 that the hyper frame number synchronization is achieved, the operations continue to 408 at which the fast-sampling by the proxy node is stopped. At 410, the operations may include the proxy node performing one or more other operations.

Figure 5:
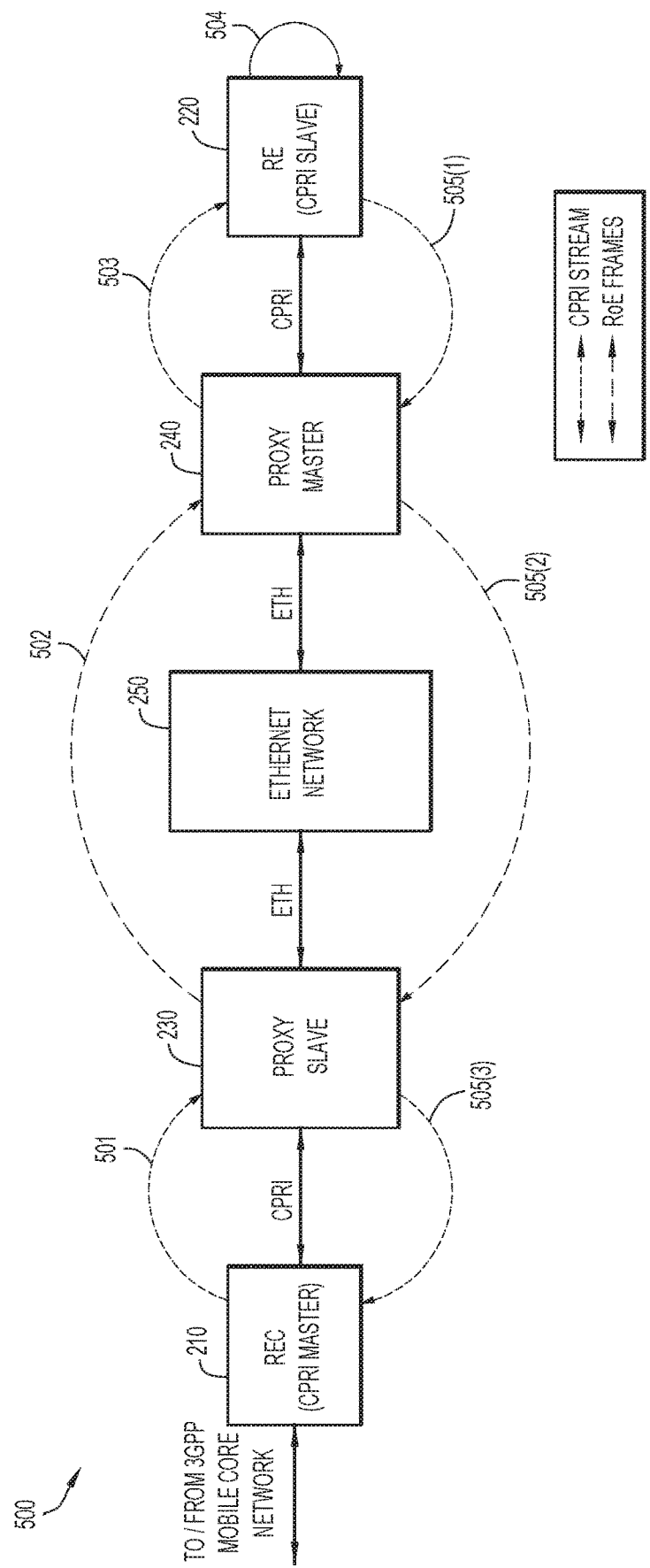
FIG. 5 is a simplified diagram illustrating example details associated with operations to provide link establishment between the radio equipment controller and the radio equipment of the fronthaul network of FIG. 2, according to an example embodiment.

Referring to FIG. 5, FIG. 5 is a simplified diagram illustrating example details associated with operations 500 to provide link establishment between the REC 210 and RE 220 of the fronthaul network 200 of FIG. 2, according to an example embodiment.

In at least one embodiment, operations 500 to provide L1 link auto-negotiation and link establishment between the REC 210 and RE 220 may be generally performed as follows:

501: Proxy Slave 230 tries to establish HFN sync with REC 210 using fast-sampling operations.

502: On achieving HFN sync, Proxy Slave 230 does not transmit back to REC 210 but starts sending RoE frames (within Ethernet frames) towards Proxy Master 240 along with indicating the link rate at which the HFN sync was achieved with REC 210 in the RoE header of the RoE frames.

503: Proxy Master 240 decodes the link bit rate information from the RoE header and transmits the CPRI stream from received the RoE frames towards the RE 220.

504: RE 220 decodes the CPRI bit stream successfully at some point in time and achieves HFN sync with the received CPRI bit stream (which was originated at REC 210).

505 [collectively, 505(1), 505(2), and 505(3)]: RE 220 starts transmitting a CPRI bit stream towards REC 210 through proxy nodes (e.g., Proxy Master 240 and Proxy Slave 230) at the link bit rate at which the HFN sync was achieved. Successful decoding of the CPRI bit stream at REC 210 will culminate or complete the L1 link auto-negotiation procedure between the REC 210 and RE 220 to establish a CPRI data link between the REC 210 and RE 220.

Operations 500 do not guarantee a highest or optimal link bit rate for the CPRI link between REC 210 and RE 220. However, these operations will help in achieving the highest or optimal link rate eventually. As per CPRI Specification v7.0, once the CPRI link is established, the REC and RE may negotiate using the C&M protocol and decide to re-establish the link using a better rate. Thus, in some embodiments, REC 210 can issue a RESET on the link and re-start the link synchronization using a 'target' best rate. The Proxy Slave 230 will notice LOS on the link during this time and will re-initiate its start-up state machine using fast-sampling for the link synchronization. Thereafter, using the operations 500 will result in link synchronization at the new link rate.

Additional details related to operations 500 are provided herein, below. Before discussing the additional details associated with operations 500, various pre-requisites for L1 link auto-negotiation may be considered. In various embodiments, pre-requisites for starting operations 500 associated with L1 link auto-negotiation between REC 210 and RE 220 may include, but not be limited to: that Proxy Slave 230 and Proxy Master 240 are configured or otherwise synchronized using a control protocol to have common subset of link bit rates (e.g., they do not necessarily have to have the same set of link bit rates); the same RoE mapperType value is set to be the same at both Proxy Slave 230 and Proxy Master 240 (i.e., both support the same mapperType mode of either the Tunneling mode or the Line coding aware mode, as specified in the IEEE 1914 standards); that packet-based communication between Proxy Slave 230 and Proxy Master 240 via Ethernet network 250 is operational; and that REC 210 and RE 220 of varied link bit rate capabilities are set up and ready for L1 link negotiation in fronthaul network 200. Other pre-requisites for starting operations 500 may be considered, as discussed herein.

In at least one embodiment, operations 500 may begin at 501 at which Proxy Slave 230 will try to establish HFN sync with REC 210. Proxy Slave 230 will follow the standard procedure described in CPRI v7.0 Specification for the operations at 501 in which REC 210 will transmit a CPRI bit stream and change its transmit link bit rate every T1 time interval (i.e., 0.9-1.1 seconds). Proxy Slave 230 performs fast-sampling on the stream and may find a common matching link bit rate within its fast-sampling time interval (i.e., 0.9-1.1 seconds) for the REC transmit time interval T1; otherwise, it may take multiple fast-sampling time intervals (e.g., depending on the number of rates configured for the capability set of the REC 210, for example, 5*T1 time interval in the worst case for four rates configured) to complete the rate matching with a match found or lack of a common match. For the operations of FIG. 5, it is assumed that Proxy Slave 230 determines common matching link bit rate with REC 210.

Further differing from standard link negotiation operations described in CPRI v7.0 Specification, on reaching HFN sync at 501, Proxy Slave 230 will not transmit back towards REC 210 at the link bit rate. Rather, the operations may include, at 502, Proxy Slave 230 packetizing/encapsulating the CPRI bit stream received from REC 210 into RoE frames (e.g., into the RoE payload of RoE frames) and transmitting the RoE frames encapsulated within Ethernet frames (towards the RE 220 direction) to Proxy Master 240 via Ethernet network 250. In the RoE header of the RoE frames, Proxy Slave 230 will indicate the current CPRI link bit rate with which it has achieved the HFN sync with REC 210. For example, in at least one embodiment, 4-bits from the optional reserved bits field in the orderInfo-seqNum field in the RoE header can be used for carrying the CPRI link bit rate information from Proxy Slave 230 to Proxy Master 240 during L1 link auto-negotiation operations. Additional details related to use of the RoE header to communicate link bit rate information are discussed below with reference to FIGS. 6A-6C.

Referring again to FIG. 5, the operations may further include, at 503, Proxy Master 240, on receiving the RoE frames from Proxy Slave 230, determining the CPRI link bit rate information from the RoE header and begin playing out (e.g., transmitting) the CPRI bit stream towards the RE 220 as per the same CPRI link bit rate determined from the RoE header of the RoE frames. For example, Proxy Master 240 can use the received RoE frames and extract out/de-map the radio data from the received RoE frames to transmit the CPRI bit stream to RE 220 at 503.

It should be noted that Proxy Master 240 will receive the RoE frames after a propagation delay from REC 210 to Proxy Master 240. However, the propagation delay will be very small (less than a millisecond) as compared to the overall time window of T1 time (0.9-1.1 seconds) that occurs before REC 210 will move to a new link bit rate.

As Proxy Master 240 is transmitting the CPRI bit stream at 503, the operations may include, simultaneously at the other end of the CPRI interconnection with Proxy Master 240, the CPRI port of RE 220 is attempting, at 504, to receive and decode the CPRI bit stream directly at the highest available link bit rate for the capability set configured for RE 220.

As per the standard CPRI v7.0 Specification procedure, RE 220 will be selecting, at 504, different line bit rates after every T2 time interval (3.9-4.1 seconds) and will be repeating the same procedure of attempting to receive the CPRI bit stream until RE 220 achieves the HFN sync (i.e., four consecutive successful detections of the SYNC byte in the received CPRI bit stream). Thus, the operations at 501, 502, 503, and 504 will be repeated again and again for different link bit rates at REC 210 and RE 220 as per the REC T1 time intervals (0.9-1.1 seconds) and REC 210 T2 time intervals (3.9-4.1 seconds) in which REC 210 continues selecting a new link bit rate for transmission and reception after every T1 time interval (0.9-1.1 seconds) until RE 220 achieves the HFN sync for the CPRI bit stream transmitted by Proxy Master 240.

Upon RE 220 reaching HFN sync, the operations may include, at 505(1), RE 220 starting to transmit a CPRI bit stream to Proxy Master 240 using the same link bit rate at which the HFN sync was achieved by RE 220. Proxy Master 240, on receiving the CPRI bit stream transmitted by RE 220, determines, at 505(2), that the end-to-end L1 synchronization has been reached between REC 210 and RE 220 and updates the internal state of the CPRI port state machine as per CPRI Specification v7.0. The operations at 505(2) may further include Proxy Master 240 starting to map the CPRI bit stream received from RE 220 into RoE frames (e.g., into the RoE payload of the frames) and transmitting the RoE frames encapsulated within Ethernet frames to Proxy Slave 230 via Ethernet network 250.

Recall, Proxy Slave 230, via operations at 501/502, has been continuing to fast-sample, sync, and frame the REC 210 transmitted CPRI bit stream for a CPRI link bit rate (as varied by REC 210 through the T1 time intervals) in RoE frames with the link bit rate information included in the RoE header of the frames and transmitting the RoE frames (encapsulated within Ethernet frames) towards Proxy Master 240/RE 220. At 505(3), the operations include Proxy Slave 230 receiving the RoE frames from Proxy Master 240 and, on receiving the RoE frames, Proxy Slave 230 beginning to de-map the received RoE frames and start playing out (e.g., transmitting) the CPRI bit stream from the RoE frames towards REC 210. Proxy Slave 230 also updates the internal state of the CPRI port state machine per CPRI Specification v7.0 indicating L1 sync is achieved from the RE 220 side.

When REC 210 is be able to receive and decode the Proxy Slave 230 transmitted CPRI bit stream, which was originally initiated by RE 220, the L1 link auto-negotiations will be considered complete as both REC 210 and RE 220 are able to communicate with each other via an established CPRI link. The operations may further include REC 210 and RE 220 performing CPRI higher layer (e.g., L2 frame alignment/sync, vendor specific negotiations, etc.) synchronization following completion of the L1 link negotiations culminating in the established CPRI link.

As illustrated in FIG. 5, Proxy Slave 230 and Proxy Master 240 may facilitate L1 link auto-negotiation between REC 210 and RE 220 to facilitate deterministic link synchronization and CPRI link establishment between REC 210 and RE 220 for fronthaul network 200. An optimal link rate, if not achieved through operations 500, can also be achieved depending on C&M negotiations.

Features associated with operations 500 for facilitating the L1 link auto-negotiation operations between REC 210 and RE 220 may include, as discussed at 501, performing fast-sampling by Proxy Slave 230 for the REC 210 transmitted CPRI bit stream and, after reaching HFN sync with REC 210, Proxy Slave 230 does not transmit a CPRI bit stream back to REC 210 at the link bit rate, rather Proxy Slave 230 starts packetizing the CPRI bit stream received from REC 210 in RoE frames and transmits the RoE frames towards RE 220 by way of Proxy Master 240. Such operations are a change in the general CPRI port state machine configured for Proxy Slave 230 in that Proxy Slave 230 should not transmit back towards the REC 210 at 501 as that would enable achieving HFN sync with REC 210. Rather Proxy Slave 230 waits until RoE frames are received from Proxy Master 240 before it transmits a CPRI bit stream towards REC 210 (e.g., 505(2) and 505(3)).

Thus, Proxy Slave 230 and Proxy Master 240 play specific roles to enable the L1 link auto-negotiation operations; thereby providing for the ability for HFN sync by REC 210 to be achieved for the CPRI bit stream as is transmitted by RE 220.

By providing changes in operations of the CPRI port state machine at Proxy Slave 230 rather than REC 210, features associated with L1 link auto-negotiation as described herein may be achieved without affecting proprietary vendor developed REC and RE units.

As discussed at 502, Proxy Slave 230 also indicates the current CPRI link bit rate in the RoE header of RoE frames transmitted toward Proxy Master 240, which indicates the link bit rate that Proxy Master 240 is to use for the CPRI bit stream transmitted to RE 220 (at 503). By decoding the CPRI link bit rate information from the RoE header, Proxy Master 240 can transmit a CPRI bit stream to RE 210 as per the determined link bit rate using the radio data contents of the received RoE frame; thereby providing for the ability for RE 220 to achieve HFN sync at the link bit rate transmitted by REC 210.

As noted previously, operations 500 do not guarantee a highest or optimal link bit rate for the CPRI link between REC 210 and RE 220. However, operations 500 will help in achieving the highest or optimal link rate eventually. As per CPRI Specification v7.0, once the CPRI link is established, the REC and RE may negotiate using the C&M protocol and decide to re-establish the link using a better rate. Thus, in some embodiments, REC 210 can issue a RESET on the link and re-start the link synchronization using a 'target' best rate. The Proxy Slave 230 will notice LOS on the link during this time and will re-initiate its start-up state machine using fast-sampling for the link synchronization. Thereafter, using the operations 500 will result in link synchronization at the new link rate.

Figure 6:
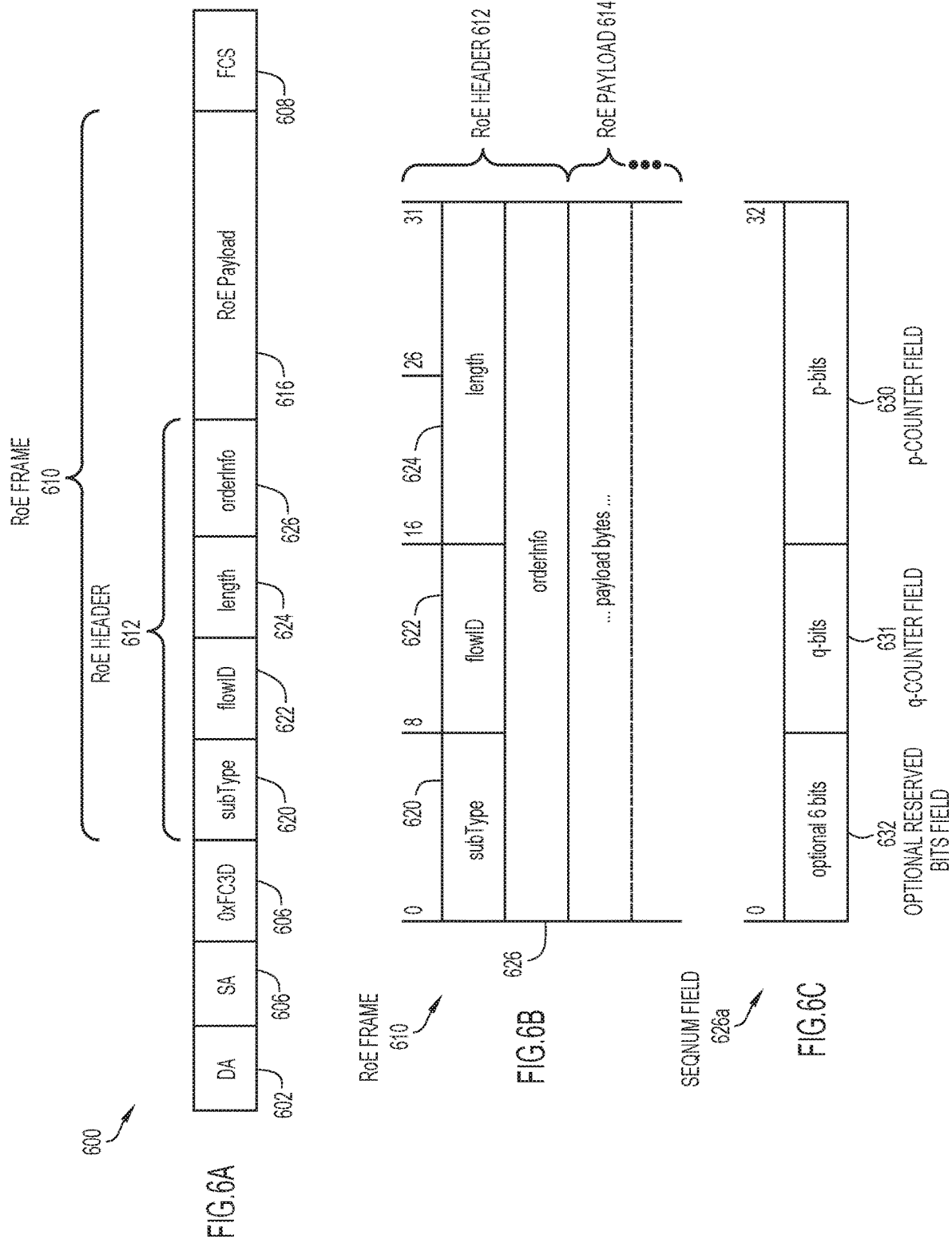
FIGS. 6A-6C are simplified diagrams illustrating example details associated with an Ethernet frame including an Radio over Ethernet (RoE) frame that may be used to communicate link bit rate information, according to an example embodiment.

Referring to FIGS. 6A-6C, FIGS. 6A-6C are simplified diagrams illustrating example details associated with an Ethernet frame 600 including a RoE frame 610 that may be used to communicate link bit rate information, according to an example embodiment. Reference is also made to preceding FIGs. in connection with the description of FIG. 6A-6C.

FIG. 6A includes Ethernet frame 600 within which RoE frame 610 is encapsulated, according to an example embodiment. Ethernet frame 600 include various fields including, but not limited to, a Destination Address (DA) field 602, a Source Address (SA) field 604, an Ethernet Type (EtherType) field 606, and a Frame Check Sequence (FCS) field 608. Ethernet frame 600 includes RoE frame 610 encapsulated therein. RoE frame 610 includes a RoE header 612 and a RoE payload 614.

In at least one embodiment of Ethernet frame 600, DA field 402 may be set to the destination Media Access Control (MAC) address for the destination node (e.g., Proxy Master 240 or Proxy Slave 230), depending on whichever node to which the RoE frame is to be transmitted; the SA field 604 may be set to the source MAC address for the source node (e.g., Proxy Master 240 or Proxy Slave 230), depending on whichever node from which the RoE frame is transmitted; the EtherType field 606 may be set to type '0xFC3D', indicating an RoE EtherType; and the FCS field 608 may be set according to a cyclic redundancy check value, which can be set/computed based on various fields, data, etc. of the Ethernet frame 600.

In at least one embodiment, RoE header 612 includes various fields including a Packet Sub Type (subType) field 620, a Flow Identifier (flowID) field 622, a Length field 624, and an Ordering Information (orderInfo) field 626.

FIG. 6B illustrates other example details associated with RoE frame 610 including RoE header 612 and RoE payload 614, according to an example embodiment. In at least one embodiment, subType field 620 may be set to indicate a RoE structure-agnostic data sub type indicating that RoE payload 614 includes a radio data payload packet, flowID field 622 may be set to a value indicating a flow/connection between Proxy Slave 230 and Proxy Master 240, and Length field 624 may be set to a value based on the RoE payload 614 size. The RoE payload 614 includes packetized radio data (e.g., CPRI bit stream) mapped therein.

According to the IEEE 1914 standards, the orderInfo field 626 is a 32-bit field that can contain sequence number information or timestamp information carried with each RoE frame 610. In general, the sequence number information can be used to identify the order of successive packets. For sequence number information contained in RoE header 612, orderInfo field 626 contains a 32-bit Sequence Number (seqNum) field 626*a*, as illustrated in FIG. 6C. Thus, orderInfo field 626 can be configured as seqNum field 626*a*, in at least one embodiment.

As illustrated in FIG. 6C, seqNum field 626*a* (of orderInfo field 626) includes a p-counter field 630 having a number of p-bits that can be used to indicate a p-counter value, a q-counter field 631 having number of q-bits that can be used to indicate a q-counter value, and an optional reserved bits field 632 having 4-bits that can be used, in at least one embodiment, to carry CPRI link bit rate information.

For structure-agnostic CPRI mapping, the RoE frame header field is the ideal place to carry CPRI link bit rate information. The information about the link bit rate is to be carried in data plane because usage of any out-of-band control plane channel will cause un-deterministic delays for this byte and frame alignment centric time sensitive link negotiation procedure.

The contents of the p-counter field 630 and the q-counter field 631 are specified by the IEEE 1914.3 Specification. However, the contents of the optional reserved bits field 632 are not specified by the IEEE 1914.3 Specification. Additionally, as per the IEEE 1914.3 Specification, the number of p-bits that can be used for the p-counter field 630 and the number of q-bits that can be used for the q-counter field 631, which indicate the size of p and q-counter fields 630, 631, respectively, is flexible (e.g., the values/sizes can be varied). Any values that can clearly indicate the start of a radio frame boundary and the sequencing of the frames can be used in a RoE mapper/de-mapper implementation.

Accordingly, in at least one embodiment, the 4-bits of the optional reserved bits field 632 of the sequNum field 626*a* (of the orderInfo field 626) in the RoE header 612 can be used to carry CPRI link bit rate information within RoE frames transmitted from Proxy Slave 230 to Proxy Master 240 during L1 link auto-negotiation operations.

In at least one embodiment, CPRI link bit rate information carried in the optional reserved bits field 632 may be a value indicating a CPRI link bit rate option. Per CPRI Specification v7.0, currently supported CPRI link bit rate options (in Megabits per second (Mbit/s) include eleven (11) link bit rate options, as follows:

1. CPRI link bit rate option 1: 614.4 Mbit/s, 8 B/10 B line coding
2. CPRI link bit rate option 2: 1228.8 Mbit/s, 8 B/10 B line coding
3. CPRI link bit rate option 3: 2457.6 Mbit/s, 8 B/10 B line coding
4. CPRI link bit rate option 4: 3072.0 Mbit/s, 8 B/10 B line coding
5. CPRI link bit rate option 5: 4915.2 Mbit/s, 8 B/10 B line coding
6. CPRI link bit rate option 6: 6144.0 Mbit/s, 8 B/10 B line coding
7. CPRI link bit rate option 7: 9830.4 Mbit/s, 8 B/10 B line coding
8. CPRI link bit rate option 7A: 8110.08 Mbit/s, 64 B/66 B line coding
9. CPRI link bit rate option 8: 10137.6 Mbit/s, 64 B/66 B line coding
10. CPRI link bit rate option 9: 12165.12 Mbit/s, 64 B/66 B line coding
11. CPRI link bit rate option 10: 24330.24 Mbit/s, 64 B/66 B line coding In at least one embodiment, the binary value of '0000b' for the 4-bits of the optional reserved bits field 632 may be reserved and the values from one (1) (e.g., binary '0001b') onwards may be used for mapping to a CPRI link bit rate option. Considering 11 rates currently supported by CPRI Specification v7.0, use of the 4-bits of the optional reserved bits field 632 may be sufficient and also allow for support of 4 additional rates in the future. Thus, the value indicating the CPRI link bit rate option may be included within 1 to 4-bits of the optional reserved bits field 632 (e.g., depending on the value to be included).

Use of the 4-bits of the of the optional reserved bits field 632 are only to be used during link negotiation operations and are not to be used for this purpose when the CPRI link is up (e.g., established) between REC 210 and RE 220.

In at least one embodiment, each of the Proxy Slave 230 and the Proxy Master 240 can be configured with a CPRI link bit rate options table that identifies each of a given value (e.g, values 1-11) that is associated with each of a given CPRI link bit rate option for each of a given CPRI link bit rate that may be used within fronthaul network 200. For example, during L1 link auto-negotiation operations, Proxy Slave 230 can use its CPRI link bit rate options table to determine a value for a given link bit rate in use (e.g., the rate of the CPRI bit stream transmitted by REC 210 for which a HFN sync is achieved by Proxy Slave 230 using fast-sampling) in order for Proxy Slave 230 to include the value in the optional reserved bits field of a seqNum field for an orderInfo field of an RoE header of an RoE frame for each Ethernet frame that is transmitted to Proxy Master 240. Proxy Master 240, upon receiving an Ethernet frame during L1 link auto-negotiation operations can determine (e.g., decode or identify) the link bit rate in use (by the REC 210) by performing a look-up on its CPRI bit rate options table using the value included in an RoE header of the RoE frame within the Ethernet frame in order to transmit (after de-mapping from the RoE payload) the CPRI bit stream to RE 220 at the identified link bit rate.

This use of 4 optional reserved bits does not violate the IEEE 1914.3 standard and also leaves enough bits for use as p/q-bits, which should be sufficient for the desired objective of orderInfo field 626 (e.g., for carrying sequence number information via the p/q-bits of the p-counter field 630 and the q-counter field 631).

Thus, use of reserved bits in the seqNum field 626a from orderInfo field 626 in the RoE header 612 provides for the ability for Proxy Slave 230 to indicate the link bit rate in use to Proxy Master 240 during L1 link auto-negotiation operations such as operations as discussed above at 501 and 502 of FIG. 5.

Figure 7:
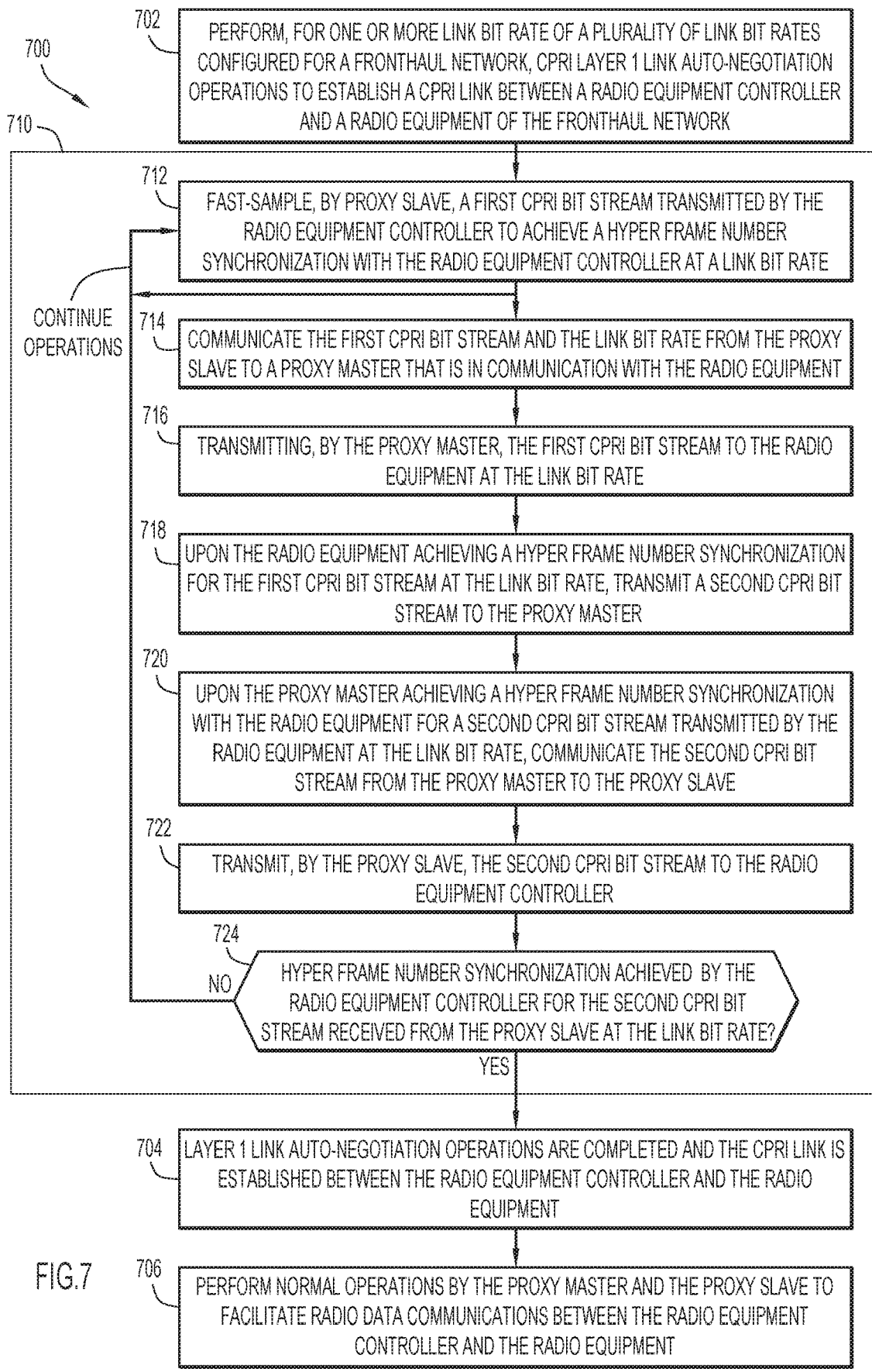
FIG. 7 is a simplified flowchart illustrating example operations to provide link establishment between an REC and RE in a fronthaul network, according to an example embodiment

Referring to FIG. 7, FIG. 7 is a simplified flowchart illustrating example operations 700 to provide link establishment between a radio equipment controller and a radio equipment in a fronthaul network, according to an example embodiment. In at least one embodiment, operations 700 can be performed via a Proxy Master, a Proxy Slave, a radio equipment controller (REC), a radio equipment (RE), and an Ethernet network for a fronthaul network, such as Proxy Master 240, Proxy Slave 230, REC 210, RE 220, and Ethernet network 250 for fronthaul network 200 as discussed herein.

In at least one embodiment prior to the start of operations 700, it is assumed that: the Proxy Slave and the Proxy Master are configured or otherwise synchronized using a control protocol to have common subset of link bit rates (e.g., they do not necessarily have to have the same set of link bit rates); the same RoE mapperType value is set to be the same at both the Proxy Slave and the Proxy Master (i.e., both support the same mapperType mode of either the Tunneling mode or the Line coding aware mode, as specified in the IEEE 1914 standards); packet-based communication between the Proxy Slave and the Proxy Master via the Ethernet network is operational; the radio equipment controller and the Radio Equipment of varied link bit rate capabilities are set up and ready for Layer 1 link negotiations in the fronthaul network; and a CPRI link bit rate options table is configured for each of the Proxy Slave and the Proxy Master in which each table is configured to identify each of a given value that is to be associated with each of a given CPRI link bit rate option for each of a given CPRI link bit rate that may be used within the fronthaul network.

In at least one embodiment, operations 700 may begin at 702 and may include performing, for one or more link bit rates of a plurality of link bit rates configured for the fronthaul network, CPRI Layer 1 link auto-negotiation operations (710) to establish a CPRI link between the radio equipment controller and the radio equipment of the fronthaul network.

In at least one embodiment, the CPRI Layer 1 link auto-negotiation operations 710 may include at 712, fast-sampling, by the Proxy Slave, a first CPRI bit stream transmitted by the radio equipment controller to achieve a hyper frame number synchronization with the radio equipment controller at a link bit rate. The fast-sampling by the Proxy Slave can be performed for one or more fast-sampling intervals, as discussed herein.

The operations at 712 are an iterative process that continue to be performed between the Proxy Slave and the radio equipment controller during the transmit time interval of the radio equipment controller until a hyper frame number synchronization is achieved for a second CPRI bit stream transmitted from the Proxy Slave to the radio equipment controller, as discussed further below. The Proxy Slave does not transmit back to the radio equipment controller when the hyper frame number synchronization is achieved at 712; rather the operations can include the Proxy Slave waiting until RoE frames are received from the Proxy Master before transmitting back to the radio equipment controller (e.g., transmitting the second CPRI bit stream contained in the RoE frames received from the Proxy Master, discussed below) at the link bit rate for which the hyper frame number synchronization is achieved for the first CPRI bit stream received from the radio equipment controller.

At 714, the operations may include, upon the proxy slave achieving the hyper frame number synchronization with the radio equipment controller for the first bit stream at the link bit rate, communicating the first CPRI bit stream and the link bit rate from the Proxy Slave to the Proxy Master. In at least one embodiment, the operations at 714 can include the Proxy Slave mapping the first CPRI bit stream into the RoE payload of RoE frames using structure-agnostic RoE mapping operations and including link bit rate information associated with the link bit rate within each RoE header of each RoE frame during the L1 link auto-negotiation operations 710. In at least one embodiment, the link bit rate information can be included as a value indicating a link bit rate option in which the value can be included within 1 to 4-bits (e.g., depending on the value to be included) of an optional reserved bits field of a seqNum field for a orderInfo field of an RoE header. The operations at 714 can further include encapsulating each RoE frame within an Ethernet frame and communicating each Ethernet frame to the Proxy Master from the Proxy Slave via the Ethernet network.

At 716, the operations may include transmitting, by the proxy master, the first CPRI bit stream to the radio equipment at the link bit rate. The operations at 716 may be performed provided that the proxy master has the link bit rate configured in its link bit rate table. If the link bit rate received is not something that it supports, it will not transmit the CPRI bit stream towards the radio equipment. In at least one embodiment, the operations at 716 can include the Proxy Master receiving each RoE frame and determining the link bit rate via the RoE header for the RoE frame (e.g., by performing a look-up using the value included in the optional reserved bits field of the seqNum field for the orderInfo field), determining that it supports the link bit rate, and de-mapping the CPRI bit stream from the RoE payload for the RoE frame (e.g., using structure-agnostic RoE de-mapping operations) in order to transmit the first CPRI bit stream to the radio equipment at the link bit rate identified in the RoE header. At 718, the operations may include, the radio equipment, upon achieving a hyper frame number synchronization for the received first CPRI bit stream at the link bit rate, transmitting a second CPRI bit stream to the Proxy Master.

At 720, the operations may include, upon the Proxy Master achieving a hyper frame number synchronization with the radio equipment for the second CPRI bit stream transmitted by the radio equipment at the link bit rate, communicating the second CPRI bit stream from the Proxy Master to the Proxy Slave. In at least one embodiment, the operations at 720 can include the Proxy Master mapping the second CPRI bit stream received from the radio equipment into the RoE payload of RoE frames using structure-agnostic RoE mapping operations, encapsulating each RoE frame into an Ethernet frame, and communicating each Ethernet frame to the Proxy Slave via the Ethernet network.

At 722, the operations may include, transmitting, by the Proxy Slave, the second CPRI bit stream to the radio equipment controller. In at least one embodiment, the operations at 722 may include the Proxy Slave de-mapping the second CPRI bit stream from the RoE payload for each RoE frame (e.g., using structure-agnostic RoE de-mapping operations) received from the Proxy Master and transmitting the second CPRI bit stream to the radio equipment controller at the link bit rate at which the Proxy Slave has achieved a hyper frame number synchronization for the CPRI first bit stream transmitted from the radio equipment controller to the Proxy Slave.

At 724, the operations may include determining, by the radio equipment controller, whether a hyper frame number synchronization is achieved by the radio equipment controller for the second CPRI bit stream received from the Proxy Slave at the link bit rate. In at least one embodiment, the operations at 724 can include the radio equipment controller attempting to perform four consecutive detections of the SYNC byte within the received second CPRI bit stream. If the radio equipment controller is unable to perform the four consecutive detections within the T1 transmit time interval (e.g., 0.9-1.1 seconds), it is determined at 524 that the hyper frame number synchronization is not achieved and the radio equipment controller begins to transmit the first CPRI bit stream at the next link bit rate from its configured capability set (e.g., the next highest rate, if available, in the round robin manner, as discussed above), and the operations continue to be performed at 712 at which the Proxy Slave continues Layer 1 link negotiations with the radio equipment controller to achieve a hyper frame number synchronization with the radio equipment controller at the next link bit rate for the first CPRI bit stream transmitted by the radio equipment controller and the operations continue therefrom as discussed above.

If, at 724, the radio equipment controller determines that the hyper frame number synchronization is achieved, the operations can continue to 704, at which the Layer 1 link auto-negotiations are completed and the CPRI link is established between the radio equipment controller and the radio equipment that allows bi-directional traffic (e.g., radio data) to be communicated between the radio equipment controller and the radio equipment when the radio equipment controller achieves a hyper frame number synchronization for the second CPRI bit stream transmitted by the proxy slave at a particular link bit rate.

At 706, the operations may include the Proxy Slave and the Proxy Master performing normal operations (e.g., performing higher layer CPRI and/or vendor specific negotiation operations, transmitting/receiving CPRI bit streams, performing mapping/de-mapping operations, transmitting/receiving Ethernet frames, monitoring for Layer 1 link alarms, etc.) to facilitate radio data communications between the radio equipment controller and the radio equipment. In at least one embodiment, operations at 706 include, the Proxy Slave not communicating the link bit rate to the Proxy Master during normal operations.

Figure 8:
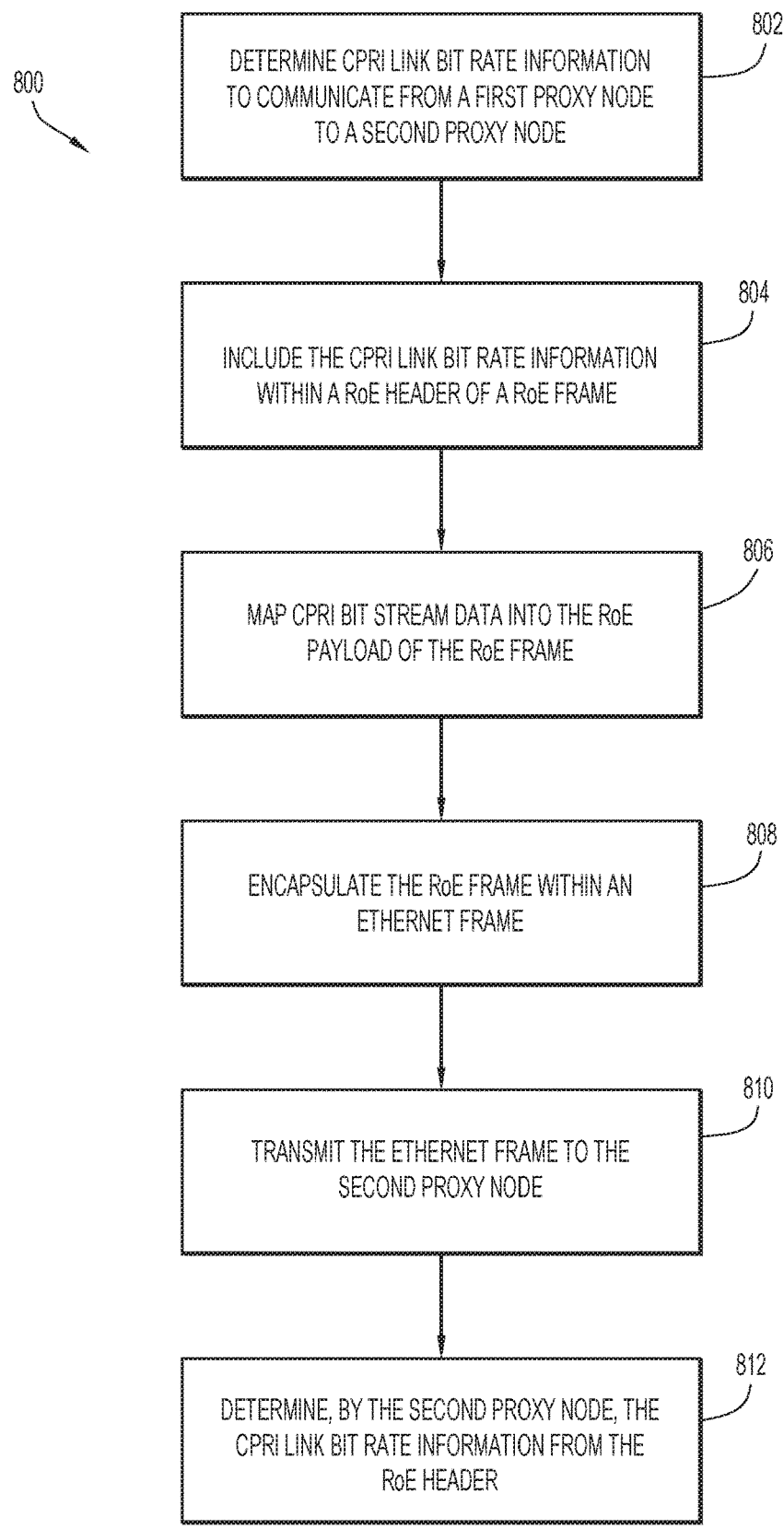
FIG. 8 is a simplified flowchart illustrating example operations to communicate link bit rate information using a RoE header of a RoE frame, according to an example embodiment.

Referring to FIG. 8, FIG. 8 is a simplified flow chart illustrating example operations to communicate link bit rate information using a RoE header of a RoE frame, according to an example embodiment. In at least one embodiment, operations 800 can be performed via a first proxy node (e.g., a Proxy Slave), a second proxy node (e.g., a Proxy Master), and an Ethernet network for a fronthaul network, such as Proxy Slave 230, Proxy Master 240, and Ethernet network 250 for fronthaul network 200 as illustrated herein.

For operations 800, it is assumed that link auto-negotiation operations are being performed to establish a CPRI link between a radio equipment controller and a radio equipment in the fronthaul network and that a CPRI link bit rate options table is configured for each of the first proxy node and the proxy node in which each table is configured to identify each of a given value that is to be associated with each of a given CPRI link bit rate option for each of a given CPRI link bit rate that may be used or supported within the fronthaul network.

In at least one embodiment, operations 800 may begin at 802 and may include determining CPRI link bit rate information to communicate from the first proxy node to the second proxy node. In at least one embodiment, the CPRI link bit rate information may be a value that is associated with to a particular CPRI link bit rate option that is associated with a particular CPRI link bit rate within the CPRI link bit rate options table configured for the first proxy node. For example, the first proxy node can determine CPRI link bit rate information to communicate to the second proxy node based on a CPRI link bit rate at which the first proxy node has achieved a hyper frame number sync for a CPRI bit stream received by the first proxy node (e.g., a CPRI bit stream transmitted from the radio equipment controller to the first proxy node, which is fast-sampled by the first proxy node to achieve the hyper frame number sync) and the first proxy node performing a look-up using the CPRI link bit rate options table to determine a corresponding value (e.g., option number) that is associated with the CPRI link bit rate.

The operations may include, at 804, the first proxy node providing the CPRI link bit rate information within a RoE header of a RoE frame. In at least one embodiment, the link bit rate information may be provided within the optional reserved bits field of a seqNum field for an orderInfo field within the RoE frame. For example, the first proxy node can include the value determined from the CPRI link bit rate options table look-up within the optional reserved bits field of a seqNum field for an orderInfo field within the RoE frame.

At 806, the operations may include the first proxy node mapping a CPRI bit stream into the RoE payload of the RoE frame. In at least one embodiment, the first proxy node can map the CPRI bit stream into the RoE payload using structure-agnostic RoE mapping operations, as prescribed by the IEEE 1914 standards. At 808, the operations may include the first proxy node encapsulating the RoE frame into an Ethernet frame. At 810, the operations may include the first proxy node transmitting the Ethernet frame to the second proxy node.

At 812, the operations may include the second proxy node determining the CPRI link bit rate information from the RoE header. In at least one embodiment, the operations at 812 can include the second proxy node de-encapsulating the RoE frame from the Ethernet frame and performing a look-up on its CPRI link bit rate options table based on the value included in the optional reserved bits field of the seqNum field for the orderInfo field within the RoE frame to determine the CPRI link bit rate. In at least one embodiment, the determined CPRI link bit rate can be used by the second proxy node to transmit the CPRI bit stream included in the RoE payload (once de-mapped from the RoE payload) to a radio equipment in order to facilitate other link auto-negotiation operations, as discussed herein.

Figure 9:
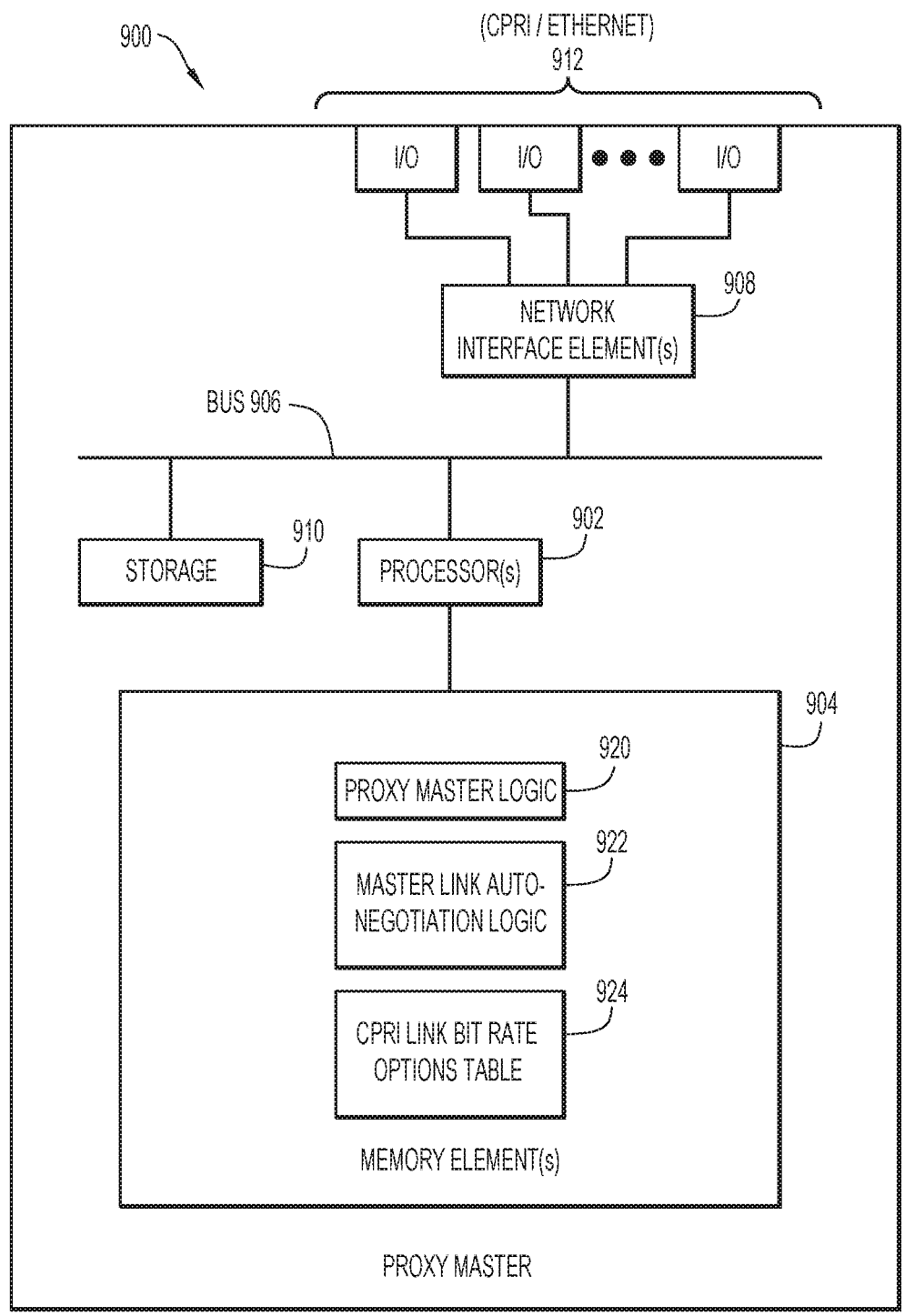
FIG. 9 is a simplified block diagram illustrating example details associated with a Proxy Master node for implementing operations described herein, according to an example embodiment.

Referring to FIG. 9, FIG. 9 is a simplified block diagram illustrating example details associated with a proxy node such as a Proxy Master 900 for implementing operations described herein, according to an example embodiment. Proxy Master 900 may provide operations associated with a Proxy Master within a fronthaul network as discussed herein such as, for example, Proxy Master 240 of fronthaul network 200.

The embodiment of FIG. 9 illustrates Proxy Master 900, which includes one or more processor(s) 902, one or more memory element(s) 704, a bus 906, one or more network interface element(s) 908, and storage 910. Memory element(s) 904 may include instructions for proxy master logic 920 and master link auto-negotiation logic 922. Memory element(s) 904 may also include a CPRI link bit rate options table 924.

In at least one embodiment, processor(s) 902 is/are at least one hardware processor configured to execute various tasks, operations, and/or functions for Proxy Master 900 according to software and/or instructions configured for Proxy Master 900. In at least one embodiment, memory element(s) 904 is/are configured to store data, information, software and/or instructions associated with Proxy Master 900 and logic configured for memory element(s) 904. In at least one embodiment, bus 906 can be configured as an interface that enables one or more elements of Proxy Master 900 (e.g., network interface element(s) 908, processor(s) 902, memory element(s) 904 (and logic, etc. configured therein), etc.) to communicate in order to exchange information and/or data, to perform operations, etc. In at least one embodiment, a fast kernel-hosted interconnect may be employed for Proxy Master 900, potentially using shared memory between processes (e.g., logic, etc.), which can enable efficient communication paths between the processes.

In various embodiments, network interface element(s) 908 enables communications (wired or wireless) between Proxy Master 900 and other network elements or nodes, via one or more input/output (I/O) elements 912 (e.g., any number/combination of CPRI ports, Ethernet ports, transceivers, etc.) at which data, information, etc. is received and transmitted to facilitate operations discussed for various embodiments described herein. In various embodiments, network interface element(s) 908 (e.g., hardware, software, firmware, logic, etc.) can be configured to include any combination of Ethernet interface elements, CPRI interface elements, Radio Frequency (RF) interface elements (e.g., for WiFi or any other unlicensed spectrum communications, for 3GPP or any other licensed spectrum communications, and/or or any other similar network interface elements to enable communications (e.g., CPRI bit stream/RoE frame mapping/de-mapping, Ethernet frame encapsulation/de-encapsulation, etc.) for Proxy Master 900 within a fronthaul network (e.g., fronthaul network 200). Proxy Master 900 can include any suitable interfaces for receiving, transmitting, and/or otherwise communicating data and/or information in a network environment.

In various embodiments, storage 910 can be configured to store data, information and/or instructions associated with Proxy Master 900 and/or logic configured for memory element(s) 904. Note that in certain examples, storage 910 can be consolidated with memory elements 904 (or vice versa), and/or the storage/memory elements can overlap/exist in any other suitable manner.

In at least one embodiment, CPRI link bit rate options table 924 may include a table in which each of a given value that is to be associated with each of a given CPRI link bit rate option for each of a CPRI link bit rate that may be used or supported within a fronthaul network (e.g., each of values 1-11 associated with each of 1-11 CPRI link bit rate options for each of 1-11 supported CPRI link bit rates as prescribed by CPRI Specification v7.0).

In various embodiments, proxy master logic 920 can include instructions that, when executed (e.g., by processor(s) 902) cause Proxy Master 900 to perform operations, which can include, but not be limited to: performing control, management, etc. operations associated with Proxy Master 900 (e.g., for CPRI bit steam/RoE frame mapping/de-mapping operations, Ethernet frame encapsulations/de-encapsulations, monitoring operations, and/or any other normal operations); cooperating and/or interacting with other logic (internal and/or external to Proxy Master 900) and/or network interface element(s) 908 (e.g., for CPRI bit stream/RoE frame mapping/de-mapping operations, Ethernet frame encapsulations/de-encapsulations, monitoring operations, and/or any other normal operations); maintaining and/or interacting with stored data, information, and/or parameters (e.g., link bit rates); combinations thereof; and/or the like to facilitate operations as discussed for various embodiments described herein.

In various embodiments, master link auto-negotiation logic 922 may include instructions that, when executed (e.g., by processor(s) 902) may facilitate various link auto-negotiation operations described herein including, but not limited to: operations associated with link auto-negotiations performed by a Proxy Master described herein; determining a link bit rate based on link bit rate information included in an RoE header; cooperating and/or interacting with other logic (internal and/or external to Proxy Master 900) and/or network interface element(s) 908; maintaining and/or interacting with stored data, information, and/or parameters; combinations thereof; and/or the like to facilitate operations as discussed for various embodiments described herein.

In various embodiments, memory element(s) 904 may include any suitable memory element such as random access memory (RAM), dynamic RAM (DRAM), static RAM (SRAM), and/or cache memory. In general, memory element(s) 904 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 910 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 910 may also be removable. For example, a removable hard drive may be used for storage 910. Other examples include optical and magnetic disks, thumb drives, and smart cards that are inserted into a drive for transfer onto another computer readable storage medium that is also part of storage 910.

Figure 10:
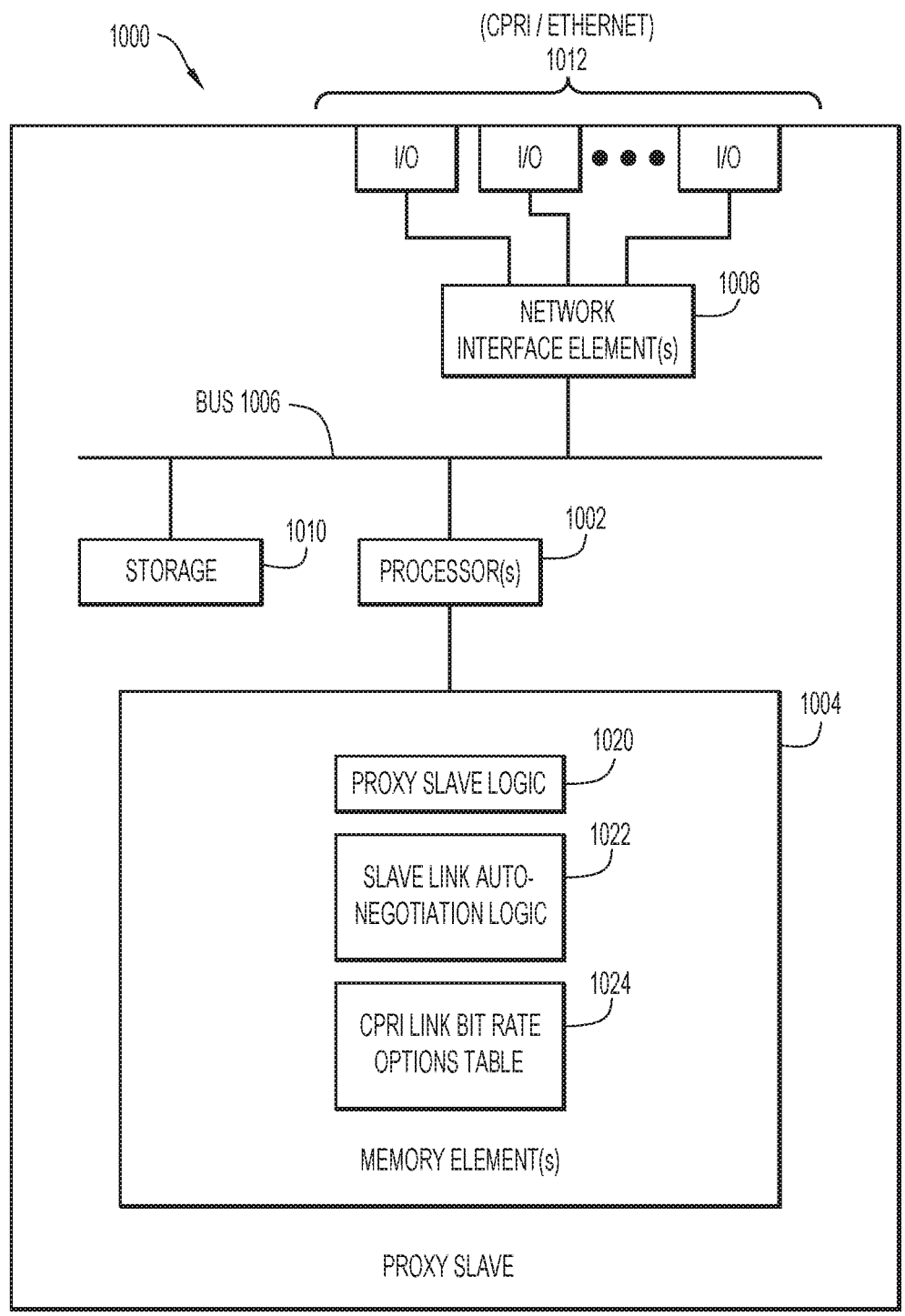
FIG. 10 is a simplified block diagram illustrating example details associated with a Proxy Slave node for implementing operations described herein, according to an example embodiment.

Referring to FIG. 10, FIG. 10 is a simplified block diagram illustrating example details associated with a proxy node such as a Proxy Slave 1000 for implementing operations described herein, according to an example embodiment. Proxy Slave 1000 may provide operations associated with a Proxy Slave within a fronthaul network as discussed herein such as, for example, Proxy Slave 230 of fronthaul network 200.

The embodiment of FIG. 10 illustrates Proxy Slave 1000, which includes one or more processor(s) 1002, one or more memory element(s) 1004, a bus 1006, one or more network interface element(s) 1008, and storage 1010. Memory element(s) 1004 may include instructions for proxy slave logic 1020 and slave link auto-negotiation logic 1022.

In at least one embodiment, processor(s) 1002 is/are at least one hardware processor configured to execute various tasks, operations, and/or functions for Proxy Slave 1000 according to software and/or instructions configured for Proxy Slave 1000. In at least one embodiment, memory element(s) 1004 is/are configured to store data, information, software and/or instructions associated with Proxy Slave 1000 and logic configured for memory element(s) 1004. In at least one embodiment, bus 1006 can be configured as an interface that enables one or more elements of Proxy Slave 1000 (e.g., network interface element(s) 1008, processor(s) 1002, memory element(s) 1004 (and logic etc. configured therein), etc.) to communicate in order to exchange information and/or data, to perform operations, etc. In at least one embodiment, a fast kernel-hosted interconnect may be employed for Proxy Slave 1000, potentially using shared memory between processes (e.g., logic, etc.), which can enable efficient communication paths between the processes.

In various embodiments, network interface element(s) 1008 enables communications (wired or wireless) between Proxy Slave 1000 and other network elements or nodes, via one or more input/output (I/O) elements 1012 (e.g., any number/combination of CPRI ports, Ethernet ports, transceivers, etc.) at which data, information, etc. is received and transmitted to facilitate operations discussed for various embodiments described herein. In various embodiments, network interface element(s) 1008 (e.g., hardware, software, firmware, logic, etc.) can be configured to include any combination of Ethernet interface elements, CPRI interface elements, RF interface elements (e.g., for WiFi or any other unlicensed spectrum communications, for 3GPP or any other licensed spectrum communications, and/or or any other similar network interface elements to enable communications (e.g., CPRI bit stream/RoE frame mapping/de-mapping, etc.) for Proxy Slave 1000 within a fronthaul network (e.g., fronthaul network 200). Proxy Slave 1000 can include any suitable interfaces for receiving, transmitting, and/or otherwise communicating data and/or information in a network environment.

In various embodiments, storage 1010 can be configured to store data, information and/or instructions associated with Proxy Slave 1000 and/or logic configured for memory element(s) 1004. Note that in certain examples, storage 1010 can be consolidated with memory elements 1004 (or vice versa), and/or the storage/memory elements can overlap/exist in any other suitable manner.

In at least one embodiment, CPRI link bit rate options table 1024 may include a table in which each of a given value that is to be associated with each of a given CPRI link bit rate option for each of a CPRI link bit rate that may be used or supported within a fronthaul network (e.g., each of values 1-11 associated with each of 1-11 CPRI link bit rate options for each of 1-11 supported CPRI link bit rates as prescribed by CPRI Specification v7.0).

In various embodiments, proxy slave logic 1020 can include instructions that, when executed (e.g., by processor(s) 1002) cause Proxy Slave 1000 to perform operations, which can include, but not be limited to: performing control, management, etc. operations associated with Proxy Slave 1000 (e.g., for CPRI bit steam/RoE frame mapping/de-mapping operations, Ethernet frame encapsulations/de-encapsulations, monitoring operations, and/or any other normal operations); cooperating and/or interacting with other logic (internal and/or external to Proxy Slave 1000) and/or network interface element(s) 1008 (e.g., for CPRI bit stream/RoE frame mapping/de-mapping operations, Ethernet frame encapsulations/de-encapsulations, monitoring operations, and/or any other normal operations); maintaining and/or interacting with stored data, information, and/or parameters (e.g., link bit rates); combinations thereof; and/or the like to facilitate operations as discussed for various embodiments described herein.

In various embodiments, slave link auto-negotiation logic 1022 may include instructions that, when executed (e.g., by processor(s) 1002) may facilitate various link auto-negotiation operations described herein including, but not limited to: operations associated with link auto-negotiations performed by a Proxy Slave described herein (e.g., fast-sampling, etc.); including link bit rate information within RoE headers of RoE frames during link auto-negotiation operations, not including link bit rate information within RoE headers of RoE frames when link auto-negotiation operations are complete; cooperating and/or interacting with other logic (internal and/or external to Proxy Slave 1000) and/or network interface element(s) 1008; maintaining and/or interacting with stored data, information, and/or parameters; combinations thereof; and/or the like to facilitate operations as discussed for various embodiments described herein.

In various embodiments, memory element(s) 1004 may include any suitable memory element such as RAM, DRAM, SRAM, and/or cache memory. In general, memory element(s) 1004 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 1010 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 1010 may also be removable. For example, a removable hard drive may be used for storage 1010. Other examples include optical and magnetic disks, thumb drives, and smart cards that are inserted into a drive for transfer onto another computer readable storage medium that is also part of storage 1010.

Figure 11:
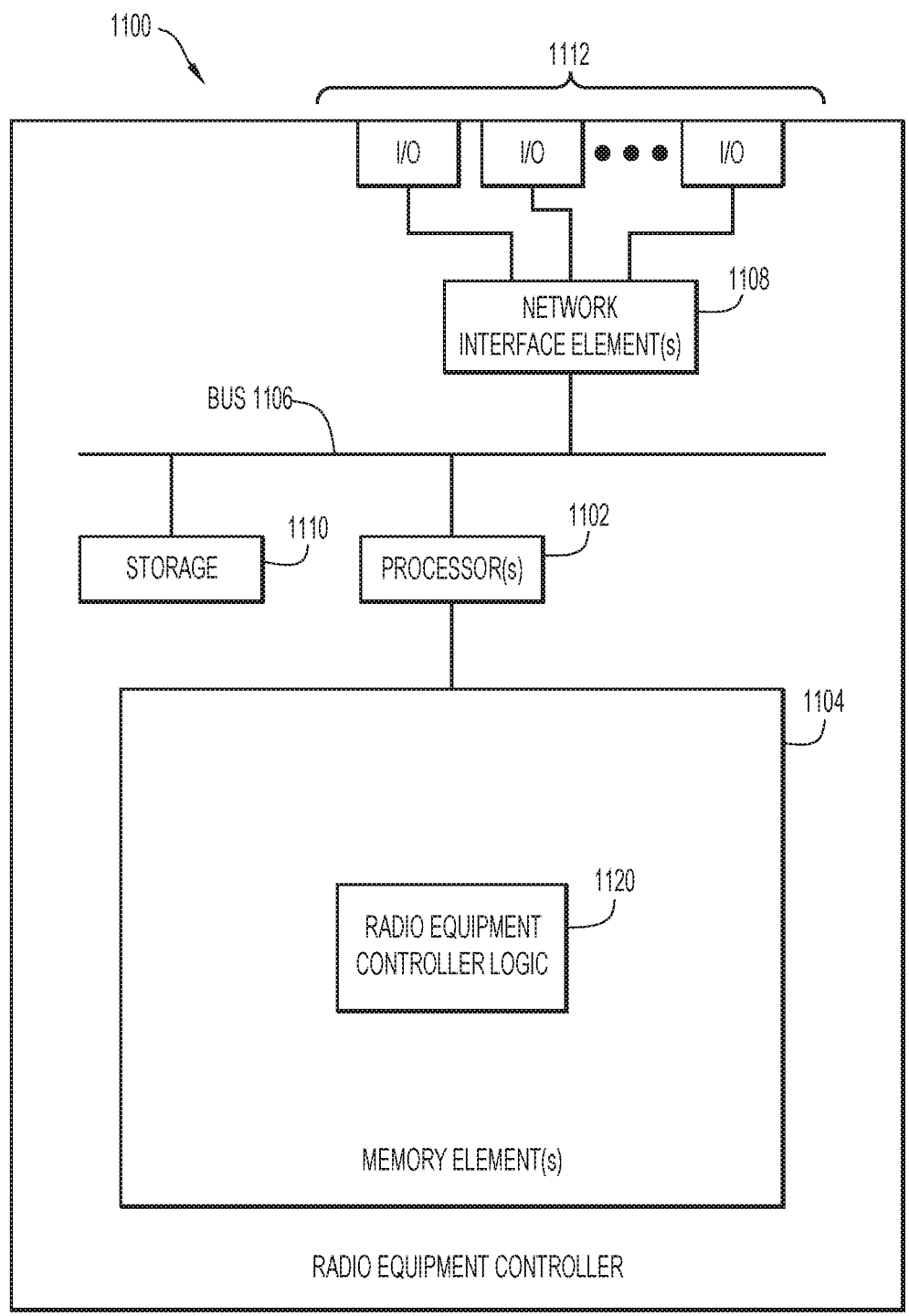
FIG. 11 is a simplified block diagram illustrating example details associated with a radio equipment controller for implementing operations described herein, according to an example embodiment.

Referring to FIG. 11, FIG. 11 is a simplified block diagram illustrating example details associated with a radio equipment controller 1100 for implementing operations described herein, according to an example embodiment. In at least one embodiment, radio equipment controller 1100 may provide operations associated with a radio equipment controller within a fronthaul network as discussed herein such as, for example, REC 210 of fronthaul network 200.

The embodiment of FIG. 11 illustrates radio equipment controller 1100, which includes one or more processor(s) 1102, one or more memory element(s) 1104, a bus 1106, one or more network interface element(s) 1108, and storage 1110. Memory element(s) 1104 may include instructions for radio equipment controller logic 1120.

In at least one embodiment, processor(s) 1102 is/are at least one hardware processor configured to execute various tasks, operations, and/or functions for radio equipment controller 1100 according to software and/or instructions configured for radio equipment controller 1100. In at least one embodiment, memory element(s) 1104 is/are configured to store data, information, software and/or instructions associated with radio equipment controller 1100 and logic configured for memory element(s) 1104. In at least one embodiment, bus 1106 can be configured as an interface that enables one or more elements of radio equipment controller 1100 (e.g., network interface element(s) 1108, processor(s) 1102, memory element(s) 1104 (and logic etc. configured therein), etc.) to communicate in order to exchange information and/or data, to perform operations, etc. In at least one embodiment, a fast kernel-hosted interconnect may be employed for radio equipment controller 1100, potentially using shared memory between processes (e.g., logic, etc.), which can enable efficient communication paths between the processes.

In various embodiments, network interface element(s) 1108 enables communications (wired or wireless) between radio equipment controller 1100 and other network elements or nodes, via one or more input/output (I/O) elements 1112 (e.g., any number/combination of CPRI ports, Ethernet ports, transceivers, etc.) at which data, information, etc. is received and transmitted to facilitate operations discussed for various embodiments described herein. In various embodiments, network interface element(s) 1108 (e.g., hardware, software, firmware, logic, etc.) can be configured to include Ethernet interface elements, CPRI interface elements, RF interface elements (e.g., for WiFi or any other unlicensed spectrum communications, for 3GPP or any other licensed spectrum communications, and/or or any other similar network interface elements to enable communications for radio equipment controller 1100 within a fronthaul network (e.g., fronthaul network 200). Radio equipment controller 1100 can include any suitable interfaces for receiving, transmitting, and/or otherwise communicating data and/or information in a network environment.

In various embodiments, storage 1110 can be configured to store data, information and/or instructions associated with radio equipment controller 1100 and/or logic configured for memory element(s) 1104. Note that in certain examples, storage 1110 can be consolidated with memory elements 1104 (or vice versa), and/or the storage/memory elements can overlap/exist in any other suitable manner.

In various embodiments, radio equipment controller logic 1120 can include instructions that, when executed (e.g., by processor(s) 1102) cause radio equipment controller 1100 to perform operations, which can include, but not be limited to: performing control, management, etc. operations associated with radio equipment controller 1100 (e.g., CPRI link negotiation operations, radio equipment controller operations, and/or any other normal operations); cooperating and/or interacting with other logic (internal and/or external to radio equipment controller 1100) and/or network interface element(s) 1108 (e.g., for CPRI link negotiation operations, radio equipment controller operations, and/or any other normal operations); maintaining and/or interacting with stored data, information, and/or parameters (e.g., link bit rates); combinations thereof; and/or the like to facilitate operations as discussed for various embodiments described herein.

In various embodiments, memory element(s) 1104 may include any suitable memory element such as RAM, DRAM, SRAM, and/or cache memory. In general, memory element(s) 1104 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 1110 may include any suitable storage such as persistent storage, which may be a magnetic disk drive, a solid state hard drive, a semiconductor storage device, ROM, EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 1110 may also be removable. For example, a removable hard drive may be used for storage 1110. Other examples include optical and magnetic disks, thumb drives, and smart cards that are inserted into a drive for transfer onto another computer readable storage medium that is also part of storage 1110.

Figure 12:
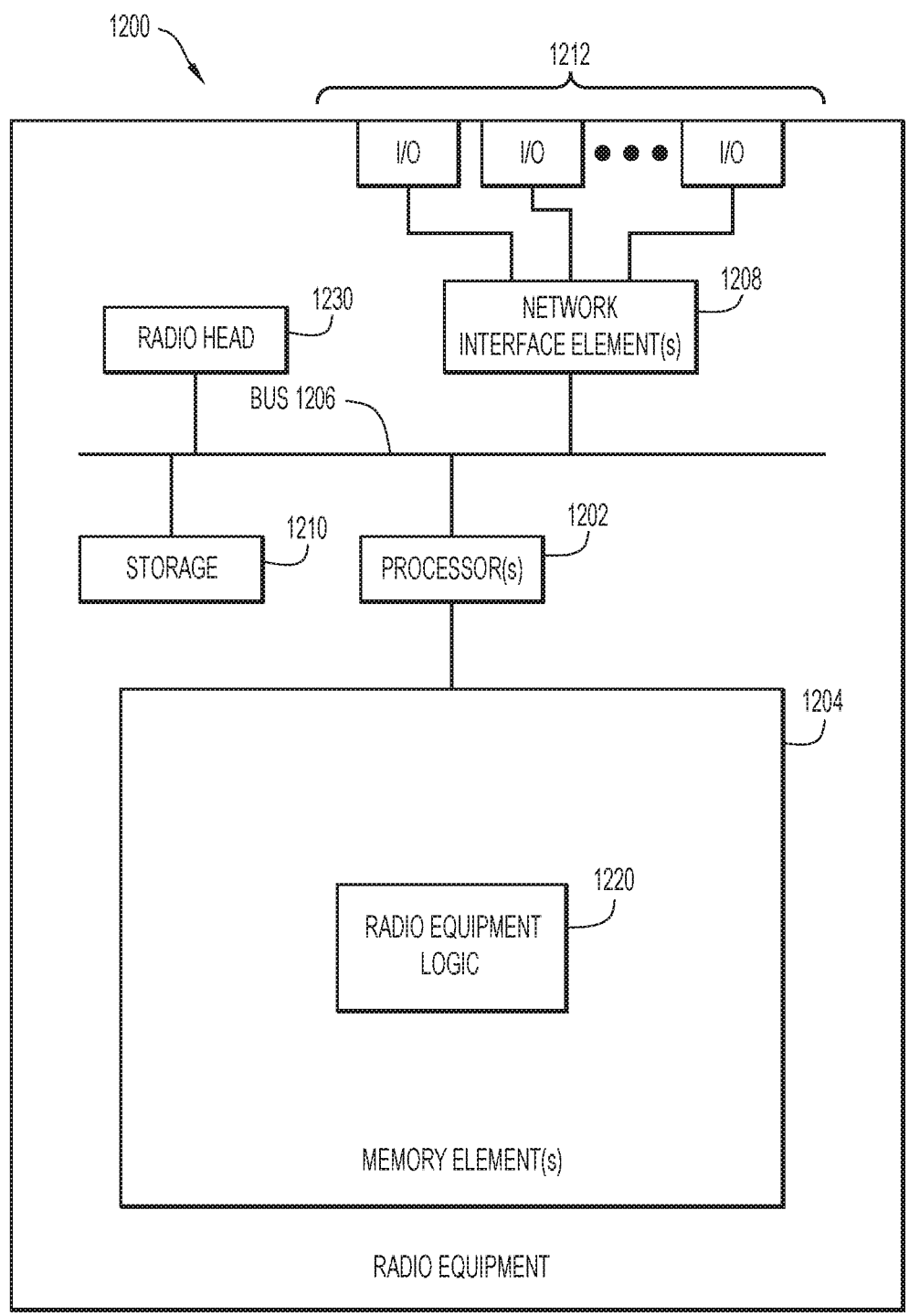
FIG. 12 is a simplified block diagram illustrating example details associated with a radio equipment for implementing operations described herein, according to an example embodiment.

Referring to FIG. 12, FIG. 12 is a simplified block diagram illustrating example details associated with a radio equipment 1200 for implementing operations described herein, according to an example embodiment. In at least one embodiment, radio equipment 1200 may provide operations associated with radio equipment within a fronthaul network as discussed herein such as, for example, RE 220 of fronthaul network 200.

The embodiment of FIG. 12 illustrates radio equipment 1200, which includes one or more processor(s) 1202, one or more memory element(s) 1204, a bus 1206, one or more network interface element(s) 1208, storage 1210, and a radio head 1230. Memory element(s) 1204 may include instructions for radio equipment logic 1220. In at least one embodiment, radio head 1230 can include circuitry, hardware, antennas, software, firmware, combinations thereof, and/or the like to provide one or more radio transmitters and receivers to facilitate over-the-air radio access connectivity for user equipment.

In at least one embodiment, processor(s) 1202 is/are at least one hardware processor configured to execute various tasks, operations, and/or functions for radio equipment 1200 according to software and/or instructions configured for radio equipment 1200. In at least one embodiment, memory element(s) 1204 is/are configured to store data, information, software and/or instructions associated with radio equipment 1200 and logic configured for memory element(s) 1204. In at least one embodiment, bus 1206 can be configured as an interface that enables one or more elements of radio equipment 1200 (e.g., network interface element(s) 1208, processor(s) 1202, memory element(s) 1004 (and logic, etc. configured therein), radio head 1230, etc.) to communicate in order to exchange information and/or data, to perform operations, etc. In at least one embodiment, a fast kernel-hosted interconnect may be employed for radio equipment 1200, potentially using shared memory between processes (e.g., logic, etc.), which can enable efficient communication paths between the processes.

In various embodiments, network interface element(s) 1208 enables communications (wired or wireless) between radio equipment 1200 and other network elements or nodes, via one or more input/output (I/O) elements 1212 (e.g., any number/combination of CPRI ports, Ethernet ports, transceivers, etc.) at which data, information, etc. is received and transmitted to facilitate operations discussed for various embodiments described herein. In various embodiments, network interface element(s) 1208 (e.g., hardware, software, firmware, logic, etc.) can be configured to include Ethernet interface elements, CPRI interface elements, RF interface elements (e.g., for WiFi or any other unlicensed spectrum communications, for 3GPP or any other licensed spectrum communications, and/or or any other similar network interface elements to enable communications for radio equipment 1200 within a fronthaul network (e.g., fronthaul network 200). Radio equipment 1200 can include any suitable interfaces for receiving, transmitting, and/or otherwise communicating data and/or information in a network environment.

In various embodiments, storage 1210 can be configured to store data, information and/or instructions associated with radio equipment 1200 and/or logic configured for memory element(s) 1204. Note that in certain examples, storage 1210 can be consolidated with memory elements 1204 (or vice versa), and/or the storage/memory elements can overlap/exist in any other suitable manner.

In various embodiments, radio equipment logic 1220 can include instructions that, when executed (e.g., by processor(s) 1202) cause radio equipment 1200 to perform operations, which can include, but not be limited to: performing control, management, etc. operations associated with radio equipment 1200 (e.g., CPRI link negotiation operations, radio equipment operations, and/or any other normal operations); cooperating and/or interacting with other logic (internal and/or external to radio equipment 1200) and/or network interface element(s) 1208 (e.g., for CPRI link negotiation operations, radio equipment operations, and/or any other normal operations); maintaining and/or interacting with stored data, information, and/or parameters (e.g., link bit rates); combinations thereof; and/or the like to facilitate operations as discussed for various embodiments described herein.

In various embodiments, memory element(s) 1204 may include any suitable memory element such as RAM, DRAM, SRAM, and/or cache memory. In general, memory element(s) 1004 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 1210 may include any suitable storage such as persistent storage, which may be a magnetic disk drive, a solid state hard drive, a semiconductor storage device, ROM, an EPROM, flash memory, or any other computer readable storage media, which may be inclusive of non-transitory tangible media and/or non-transitory computer readable storage media, that is capable of storing program/logic/software instructions and/or digital information. In some embodiments, the media used by storage 1210 may also be removable. For example, a removable hard drive may be used for storage 1210. Other examples include optical and magnetic disks, thumb drives, and smart cards that are inserted into a drive for transfer onto another computer readable storage medium that is also part of storage 1210.

In summary, presented herein are techniques that provide a method to achieve link auto-negotiation and establishment between an REC and RE in an Ethernet-based fronthaul network, in at least one embodiment. Due to the adoption of massive Multiple-Input Multiple-Output (MIMO) technologies and huge bandwidth requirements for 5G communication, current deployments for LTE, LTE-Advanced, LTE-Advanced Pro and new 5G technology based deployments need to move to packetized fronthaul based networks. The existing deployments of these technologies where CPRI technology is used for interconnection between REC and RE should also work in Ethernet-based packetized fronthaul networks, i.e., the CPRI streams need to be packetized and sent over the packet network towards the other CPRI end point in packets where the CPRI stream will be extracted again and passed to the actual CPRI end point (REC/RE). This may allow for better adoption of 5G in the already existing network deployments.

While, the IEEE 1914.1 and IEEE 1914.3 Specifications are the standards for packet-based fronthaul transport networks; these standards do not cover how end-to-end link negotiations can happen between REC and RE in the fronthaul networks. Embodiments herein provide techniques to solve this above gap. For example, a network operator can deploy CPRI-based REC and/or RE units of varied capabilities in fronthaul network and the techniques discussed for embodiments herein can be used to achieve end-to-end CPRI link synchronization, which otherwise would require static manual configurations at each CPRI interface which is error prone, inefficient at times, and not scalable. Through fast-sampling by Proxy Slave 230, embodiments herein provide for the ability to achieve deterministic end-to-end CPRI link synchronization between the REC 210 and RE 220.

In one form, a computer-implemented method is provided, which may include receiving, by a proxy node, a Common Public Radio Interface (CPRI) bit stream transmitted by a radio equipment controller, wherein the CPRI bit stream is transmitted within a transmit time interval of the radio equipment controller; and fast-sampling, by the proxy node, the CPRI bit stream to determine whether a hyper frame number synchronization with the radio equipment controller at a common matching link bit rate is achievable, wherein the fast-sampling comprises attempting to decode the received CPRI bit stream and achieve the hyper frame number synchronization for each of a plurality of link bit rates configured for a fast-sampling time period during at least one fast-sampling time interval configured for the proxy node. For the method, each fast-sampling time interval comprises one fast-sampling time period. In some instances, each fast-sampling time interval may include multiple fast-sampling time periods. The fast-sampling time interval may be between 0.9 seconds and 1.1 seconds. The transmit time interval of the radio equipment controller may be between 0.9 seconds and 1.1 seconds.

The method may further include, upon the proxy node achieving the hyper frame number synchronization with the radio equipment controller at a particular link bit rate, communicating the received CPRI bit stream and the particular link bit rate to another proxy node via a packet-based network. The particular link bit rate may be communicated using a value that indicates a link bit rate option associated with the particular link bit rate.

In another form, another computer-implemented method is provided, which may include performing, for one or more link bit rates of a plurality of link bit rates configured for a fronthaul network, Common Public Radio Interface (CPRI) Layer 1 link auto-negotiation operations to establish a CPRI link between a radio equipment controller and a radio equipment of the fronthaul network. The CPRI Layer 1 link auto-negotiation operations may include fast-sampling, by a proxy slave, a first CPRI bit stream transmitted by a radio equipment controller to achieve a hyper frame number synchronization with the radio equipment controller at a link bit rate, wherein the fast-sampling comprises attempting to achieve the hyper frame number synchronization for each of a plurality of link bit rates configured for a fast-sampling time period during at least one fast-sampling time interval configured for the proxy slave. Upon the proxy slave achieving the hyper frame number synchronization with the radio equipment controller, the method may include communicating the first CPRI bit stream and the link bit rate from the proxy slave to a proxy master. The method may further include transmitting, by the proxy master, the first CPRI bit stream to the radio equipment at the link bit rate and the radio equipment attempting to achieve a hyper frame number synchronization with the first CPRI bit stream. Upon the radio equipment achieving the hyper frame number synchronization, the method may include the radio equipment communicating a second CPRI bit stream to the proxy master at the link bit rate. Upon the proxy master achieving a hyper frame number synchronization with the radio equipment for the second CPRI bit stream transmitted by the radio equipment at the link bit rate, the method may include communicating the second CPRI bit stream from the proxy master to the proxy slave transmitting, by the proxy slave, the second CPRI bit stream to the radio equipment controller.

The CPRI Layer 1 link auto-negotiation operations are completed and the CPRI link is established between the radio equipment controller and the radio equipment when the radio equipment controller achieves a hyper frame number synchronization for the second CPRI bit stream transmitted by the proxy slave at a particular link bit rate. The CPRI Layer 1 link auto-negotiation operations are performed within one transmit time interval of the radio equipment controller. The CPRI Layer 1 link auto-negotiation operations may be repeated with the plurality of link bit rates until the radio equipment controller achieves the hyper frame number synchronization for the second CPRI bit stream transmitted by the proxy slave at the particular link bit rate.

Upon achieving the hyper frame number synchronization with the radio equipment controller, the proxy slave does not transmit to the radio equipment controller until the second CPRI bit stream is received from the proxy master. The first CPRI bit steam and the link bit rate may be communicated from the proxy slave to the proxy master using an Ethernet network and the second CPRI bit stream is communicated from the proxy master to the proxy slave using the Ethernet network. Upon the Layer 1 link auto-negotiation operations being completed, the proxy slave does not communicate the link bit rate to the proxy master. Communicating the link bit rate may include communicating a value indicating a link bit rate option associated with the link bit rate. The value indicating the link bit rate option may be included within a header of a Radio over Ethernet (RoE) frame that is encapsulated within an Ethernet frame. The value indicating the link bit rate option may be included within a sequence number field of the header. The value indicating the link bit rate option may be included within one to four bits of a sequence number field of the header.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, network element, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, personal digital assistant (PDA), mobile devices, etc.), and may include any commercially available operating system and any combination of commercially available and custom software (e.g., machine learning software, etc.). These systems may include any types of monitors and input/output devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), a field programmable gate array (FPGA), in digital signal processing (DSP) instructions, firmware, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., an FPGA, a DSP processor, an EPROM, a controller, an electrically erasable PROM (EEPROM), or an ASIC that includes digital logic, software, firmware, code, electronic instructions, or any suitable combination thereof.

In one example implementation, a network element can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for networks such as discussed herein).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, networks can represent a series of points or elements of interconnected communication paths (wired or wireless) for receiving and transmitting packets of information that propagate through networks. In various embodiments, networks can be associated with and/or provided by a single network operator or service provider and/or multiple network operators or service providers. In various embodiments, networks can include and/or overlap with, in whole or in part, one or more packet data network(s). A network may offer communicative interfaces between various elements of the network and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment Networks through which communications propagate in can use any suitable technologies for communication including wireless (e.g., 3G/4G/5G/NG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein, can be inclusive of an executable file comprising instructions that can be understood and processed on a computer, processor, machine, network element, compute node, combinations thereof, or the like and may further include library modules loaded during execution, object files, system files, hardware logic, software logic, and/or any other executable modules.

The embodiments presented may be implemented in various forms, such as an apparatus, a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding figures illustrate only some of the possible scenarios that may be executed by, or within, a system or network. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
   receiving, by a proxy node, a Common Public Radio Interface (CPRI) bit stream transmitted by a radio equipment controller, wherein the CPRI bit stream is transmitted within a transmit time interval of the radio equipment controller; and
   fast-sampling, by the proxy node, the CPRI bit stream to achieve a hyper frame number synchronization with the radio equipment controller at a common matching link bit rate, wherein the fast-sampling comprises attempting to decode the CPRI bit stream and achieve the hyper frame number synchronization using each of a link bit rate of a plurality of link bit rates configured for a link bit rate fast-sampling set that is to be utilized within a fast-sampling time period during at least one fast-sampling time interval, wherein the at least one fast-sampling time interval is set based on the transmit time interval of the radio equipment controller such that all of the plurality of link bit rates configured for the link bit rate fast-sampling set are capable of being utilized within each of one or more fast-sampling time periods for each of the at least one fast-sampling time interval in order to attempt to decode the CPRI bit stream and achieve the hyper frame number synchronization by the proxy node.

2. The method of claim 1, wherein each fast-sampling time interval comprises one fast-sampling time period.

3. The method of claim 1, wherein each fast-sampling time interval comprises multiple fast-sampling time periods.

4. The method of claim 1, wherein the fast-sampling time interval is between 0.9 seconds and 1.1 seconds.

5. The method of claim 1, wherein the transmit time interval of the radio equipment controller is between 0.9 seconds and 1.1 seconds.

6. The method of claim 1, further comprising:
   upon the proxy node achieving the hyper frame number synchronization with the radio equipment controller at a particular link bit rate, communicating the CPRI bit stream and the particular link bit rate to another proxy node via a packet-based network.

7. One or more non-transitory computer readable storage media encoded with instructions that, when executed by a processor, cause the processor to perform operations, comprising:
   receiving, by a proxy node, a Common Public Radio Interface (CPRI) bit stream transmitted by a radio equipment controller, wherein the CPRI bit stream is transmitted within a transmit time interval of the radio equipment controller; and
   fast-sampling, by the proxy node, the CPRI bit stream to achieve a hyper frame number synchronization with the radio equipment controller at a common matching link bit rate, wherein the fast-sampling comprises attempting to decode the CPRI bit stream and achieve the hyper frame number synchronization using each of a link bit rate of a plurality of link bit rates configured for a link bit rate fast-sampling set that is to be utilized within a fast-sampling time period during at least one fast-sampling time interval, wherein the at least one fast-sampling time interval is set based on the transmit time interval of the radio equipment controller such that all of the plurality of link bit rates configured for the link bit rate fast-sampling set are capable of being utilized within each of one or more fast-sampling time periods for each of the at least one fast-sampling time period in order to attempt to decode the CPRI bit stream and achieve the hyper frame number synchronization by the proxy node.

8. The media of claim 7, wherein each fast-sampling time interval comprises one fast-sampling time period.

9. The media of claim 7, wherein each fast-sampling time interval comprises multiple fast-sampling time periods.

10. The media of claim 7, wherein the fast-sampling time interval is between 0.9 seconds and 1.1 seconds.

11. The media of claim 7, wherein the transmit time interval of the radio equipment controller is between 0.9 seconds and 1.1 seconds.

12. The media of claim 7, further comprising instructions that, when executed by a processor, cause the processor to perform operations, comprising:
   upon the proxy node achieving the hyper frame number synchronization with the radio equipment controller at a particular link bit rate, communicating the CPRI bit stream and the particular link bit rate to another proxy node via a packet-based network.

13. A proxy node, comprising:
   at least one memory element for storing data; and
   at least one processor for executing instructions associated with the data, wherein executing the instructions causes the proxy node to perform operations, comprising:
      receiving a first Common Public Radio Interface (CPRI) bit stream transmitted by a radio equipment controller, wherein the first CPRI bit stream is transmitted within a transmit time interval of the radio equipment controller; and
      fast-sampling the first CPRI bit stream to achieve a hyper frame number synchronization with the radio equipment controller at a common matching link bit rate, wherein the fast-sampling comprises attempting to decode the first CPRI bit stream and achieve the hyper frame number synchronization using each of a link bit rate of a plurality of link bit rates configured for a link bit rate fast-sampling set that is to be utilized within a fast-sampling time period during at least one fast-sampling time interval, wherein the at least one fast-sampling time interval is set based on the transmit time interval of the radio equipment controller such that all of the plurality of link bit rates configured for the link bit rate fast-sampling set are capable of being utilized within each of one or more fast-sampling time periods for each of the at least one fast-sampling time interval in order to attempt to decode the first CPRI bit stream and achieve the hyper frame number synchronization by the proxy node.

14. The proxy node of claim 13, wherein each fast-sampling time interval comprises one fast-sampling time period.

15. The proxy node of claim 13, wherein each fast-sampling time interval comprises multiple fast-sampling time periods.

16. The proxy node of claim 13, wherein the fast-sampling time interval is between 0.9 seconds and 1.1 seconds.

17. The proxy node of claim 13, wherein the transmit time interval of the radio equipment controller is between 0.9 seconds and 1.1 seconds.

18. The proxy node of claim 13, wherein executing the instructions causes the proxy node to perform further operations, comprising:
upon the proxy node achieving the hyper frame number synchronization with the radio equipment controller at a particular link bit rate, communicating the first CPRI bit stream and the particular link bit rate to another proxy node via a packet-based network.

19. The proxy node of claim 18, wherein the first CPRI bit stream and the particular link bit rate are communicated to the another proxy node via at least one Radio over Ethernet (RoE) frame, wherein the link bit rate is indicated in a header of the at least one RoE frame and the first CPRI bit stream is included in an RoE payload of the at least one RoE frame.

20. The proxy node of claim 18, wherein upon the proxy node achieving the hyper frame number synchronization with the radio equipment controller, the proxy node does not transmit to the radio equipment controller until a second CPRI bit stream is received from the another proxy node.

* * * * *